United States Patent
Le et al.

(10) Patent No.: US 10,339,656 B1
(45) Date of Patent: Jul. 2, 2019

(54) INFERRING COUNT OF ITEMS USING IMAGE

(71) Applicant: AMAZON TECHNOLOGIES, INC., Seattle, WA (US)

(72) Inventors: Vuong Van Le, Seattle, WA (US); Joseph Patrick Tighe, Seattle, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 89 days.

(21) Appl. No.: 15/280,595

(22) Filed: Sep. 29, 2016

(51) Int. Cl.
*G06T 7/62* (2017.01)
*G06T 7/00* (2017.01)
*G06T 7/60* (2017.01)

(52) U.S. Cl.
CPC ............ *G06T 7/0042* (2013.01); *G06T 7/602* (2013.01); *G06T 7/62* (2017.01); *G06T 2207/10012* (2013.01); *G06T 2207/20081* (2013.01); *G06T 2207/30244* (2013.01)

(58) Field of Classification Search
CPC .................................................. G06T 7/0042
See application file for complete search history.

(56) References Cited

U.S. PATENT DOCUMENTS

| | | | |
|---|---|---|---|
| 7,225,980 B2 | 6/2007 | Ku et al. | |
| 7,949,568 B2 | 5/2011 | Fano et al. | |
| 8,009,864 B2* | 8/2011 | Linaker | G06K 9/00664 235/385 |
| 8,189,855 B2 | 5/2012 | Opalach et al. | |
| 8,630,924 B2* | 1/2014 | Groenevelt | G06Q 10/087 211/90.01 |
| 8,660,355 B2* | 2/2014 | Rodriguez | G06K 9/00973 382/118 |
| 8,923,566 B2* | 12/2014 | Hsieh | G01C 11/04 382/100 |
| 8,996,413 B2* | 3/2015 | Argue | G06Q 10/087 705/28 |
| 9,235,928 B2 | 1/2016 | Medioni et al. | |

(Continued)

OTHER PUBLICATIONS

Asthana, et al., "An indoor wireless system for personalized shopping assistance", CiteSeerX, In Proceedings of IEEE Workshop on Mobile Computing Systems and Applications, 1994; [retrieved on Jun. 30, 2013]. Retrieved from the Internet: <URL:http://citeseerx.ist.psu.edu/viewdoc/summary?doi=10.1.1.127.3033>.

(Continued)

*Primary Examiner* — Jayanti K Patel
*Assistant Examiner* — Irfan Habib
(74) *Attorney, Agent, or Firm* — Lindauer Law, PLLC

(57) ABSTRACT

Images of a fixture such as a shelf holding items may be acquired by cameras and processed to count the quantity of items at the fixture. A top of an item is determined in the image. Given information about the items designated for stowage at the fixture and the location of the top, a three-dimensional (3D) bounding box indicative of a volume is determined relative to the fixture. Bounding boxes which extend outside the boundaries of the fixture are disregarded. Remaining bounding boxes may then be analyzed to determine a measured height of the item(s) in a stack. The measured height may be divided by a per-item height to determine a quantity of items in the stack. The quantities in multiple stacks may be summed to determine a quantity at the fixture.

20 Claims, 7 Drawing Sheets

(56) References Cited

U.S. PATENT DOCUMENTS

| | | | | |
|---|---|---|---|---|
| 9,492,923 B2* | 11/2016 | Wellman | B25J 9/1612 |
| 9,552,587 B2* | 1/2017 | Naqvi | H04W 4/029 |
| 9,595,109 B1* | 3/2017 | Umakhanov | G06T 7/0042 |
| 9,697,429 B2* | 7/2017 | Patel | G06K 9/4604 |
| 9,710,926 B2* | 7/2017 | Zhang | G06K 9/00771 |
| 9,715,707 B2* | 7/2017 | Naqvi | G06Q 30/02 |
| 9,805,331 B2* | 10/2017 | Hsu | G06Q 10/087 |
| 9,928,438 B2* | 3/2018 | Wu | G06K 9/3233 |
| 9,940,538 B2* | 4/2018 | Kim | G06F 16/54 |
| 9,984,354 B1* | 5/2018 | Chinoy | G06Q 10/087 |
| 9,996,818 B1* | 6/2018 | Ren | G06F 16/5866 |
| 10,007,892 B1* | 6/2018 | Hahn | G06Q 10/087 |
| 10,007,964 B1* | 6/2018 | Calhoon | G06T 1/0021 |
| 10,037,449 B1* | 7/2018 | Hahn | G06K 7/0008 |
| 10,040,628 B1* | 8/2018 | Misra | G06Q 10/08 |
| 10,096,114 B1* | 10/2018 | Lasenby | G06T 7/0042 |
| 10,157,452 B1* | 12/2018 | Tighe | G06T 5/006 |
| 2002/0143672 A1* | 10/2002 | Sawasaki | G06Q 10/087 705/29 |
| 2008/0043113 A1* | 2/2008 | Ishii | G06T 3/4038 348/218.1 |
| 2011/0011936 A1 | 1/2011 | Morandi et al. | |
| 2012/0284132 A1* | 11/2012 | Kim | G07G 1/0081 705/20 |
| 2013/0284806 A1* | 10/2013 | Margalit | G06Q 30/06 235/382 |
| 2014/0240520 A1* | 8/2014 | Liu | G06T 7/80 348/187 |
| 2015/0086107 A1* | 3/2015 | Dedeoglu | G06K 9/00771 382/154 |
| 2015/0088701 A1* | 3/2015 | Desmarais | G06Q 10/087 705/28 |
| 2015/0116494 A1* | 4/2015 | Esaka | B60R 1/00 348/148 |
| 2015/0262116 A1* | 9/2015 | Katircioglu | G06Q 10/087 705/28 |
| 2016/0205319 A1* | 7/2016 | Oota | H04N 5/23238 348/38 |
| 2018/0029797 A1* | 2/2018 | Hance | B65G 1/1373 |
| 2018/0088586 A1* | 3/2018 | Hance | G05D 1/0236 |

OTHER PUBLICATIONS

Hasegawa, et al., "Human Body Equivalent Phantom for Analyzing of Surface and Space Propagation in MHz-Band Signal Transmission", Department of Electronics, Kyoto Institute of Technology. Retrievable from Internet: <<http://ieeexplore.ieee.org/document/7481823/>>.

Kalnikaite, et al., "How to Nudge In Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011. Retrieved from Internet: <URL:http://www.researchgate.net/publication/221568350_How_to_nudge_in_Situ_designing_lambent_devices_to_deliver_salient_information_in_supermarkets>.

Pop, Cristian, "Introduction to the BodyCom Technology", AN1391, DS01391A, Microchip Technology, Inc., May 2, 2011.

Valtonen, Miika, "Technologies for Smart Environments: Capacitive User Tracking and Proactive Fuzzy Control", Tampere University of Technology. Publication 1044. 2012. Retrieved from Internet: <<http://dspace.cc.tut.fi/dpub/bitstream/handle/123456789/21002/valtonen.pdf?sequence=3&isAllowed=y>>.

Vu, et al., "Distinguishing Users with Capacitive Touch Communication", WINLAB, Rutgers University, In proceedings of: The 18th Annual International Conference on Mobile Computing and Networking ("MobiCom'12"), Aug. 22-26, 2012, Istanbul, Turkey.

Chang, et al., "LIBSVM: A Library for Support Vector Machines", National Taiwan University. Initial Version: 2001. Last Updated: Mar. 4, 2013. Retrieved from Internet: <URL: http://www.csie.ntu.edu.tw/~cjlin/papers/libsvm.pdf>.

Dalal, et al., "Histograms of Oriented Gradients for Human Detection", 2005. Retrieved from Internet: <URL: http://lear.inrialpes.fr/people/triggs/pubs/Dalal-cvpr05.pdf>.

* cited by examiner

INFERRING COUNT OF ITEMS USING IMAGE

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from inventory and take them to a cashier for purchase, rental, and so forth.

Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor quantity of inventory within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
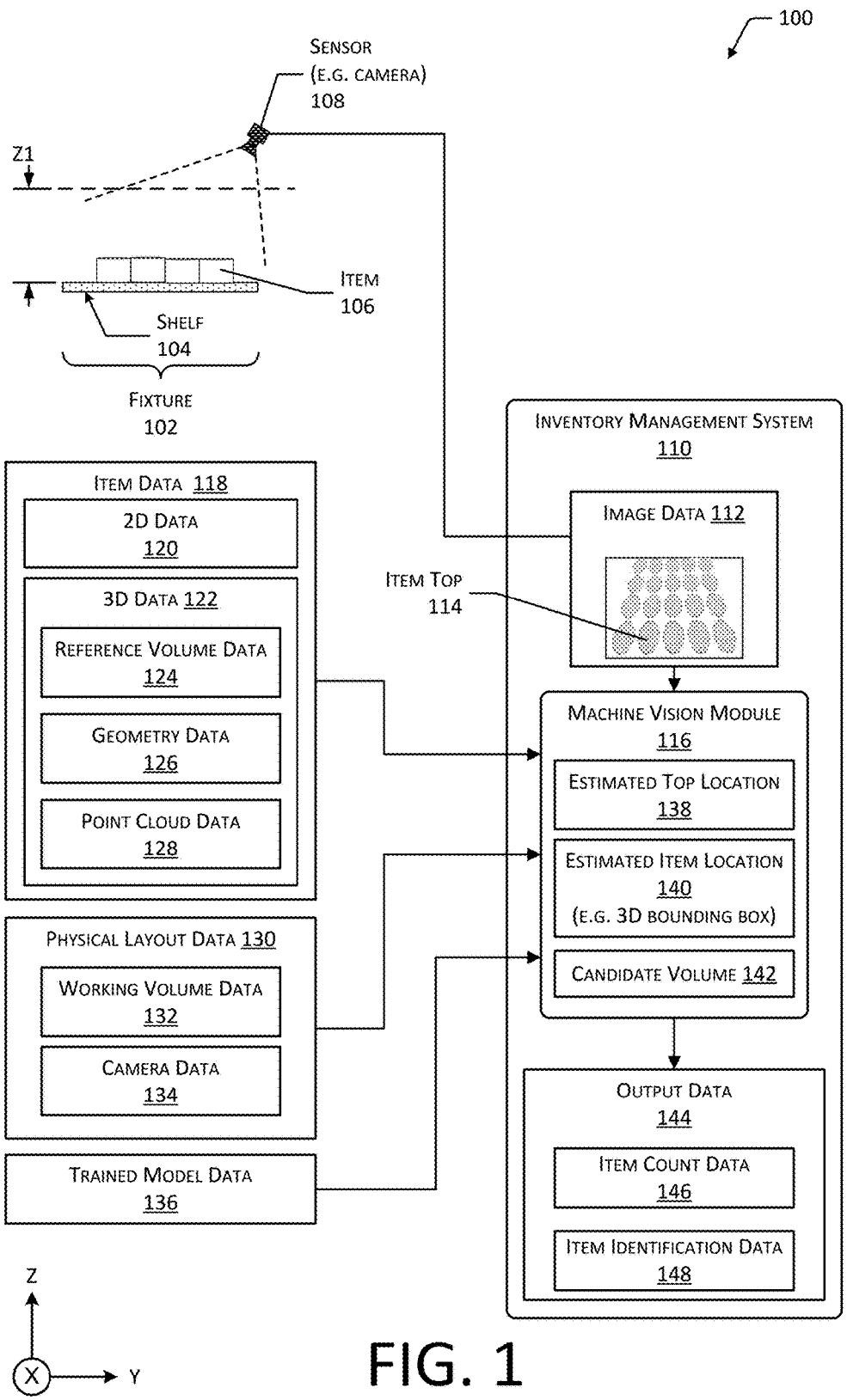
FIG. 1 illustrates an image processing system to determine a count of items at a fixture using image data, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

This disclosure describes systems and techniques for processing image data acquired from cameras to determine output data, such as identifying or counting items stowed at a fixture in a materials handling facility (facility) or in other facilities. The fixture may include shelving, hangers, lockers, bins, and so forth. This output data may be used to determine occurrence of, and information about, interactions with the items. For example, interactions may comprise a user picking an item from a fixture, placing an item at a fixture, and so forth.

The facility may include, or have access to, an inventory management system. The inventory management system may be configured to maintain information about items, users, condition of the facility, and so forth. For example, the inventory management system may maintain data indicative of a number of items at a particular fixture, what items a particular user is ordered to pick, how many items have been picked or placed at the fixture, requests for assistance, environmental status of the facility, and so forth.

Operation of the facility may be facilitated by using one or more sensors to acquire information about interactions in the facility. The inventory management system may process the sensor data from the one or more sensors to determine interaction data. For example, the inventory management system may use the interaction data to determine a type of item a user picked from a particular fixture, to adjust the count of inventory stowed at the particular fixture, and so forth.

Described in this application are techniques for processing image data from sensors, such as cameras that are viewing the fixture at an oblique angle, to determine a count of the items stowed at the fixture. Images of the fixture are obtained at an oblique angle. The image is processed by a machine vision module to determine an estimated location of the tops of the items. Item data about the items is retrieved, which provides three dimensional (3D) data about the type of item. Using the estimated location of the top, the estimated item location for the item may be determined. For example, by knowing where the top of the can of pet foot is located with respect to a shelf, the size and shape of the rest of the can may be inferred.

A candidate volume of estimated item locations may be determined. Given the 3D data known about an individual item, the number of items that can fit within the candidate volume may be calculated to provide item count data.

Some estimated item locations may be removed from consideration or disregarded in the calculation of the candidate volume. Errors during image processing, optical effects such as shadows and reflections, and so forth, may result in the detection of a top of an item even when no item is actually there. This may result in erroneous estimated item locations. In one implementation, data about a working volume may be accessed and used to determine if any estimated item locations are at least partially outside of this working volume. The working volume is the volume within which items are expected to be stowed. For example, the working volume may be bounded by a shelf at the bottom, another shelf up above, and lane dividers on the left and right. An item is not expected to be halfway through the shelf, so those estimated item locations that are at least partially outside the working volume are removed from consideration.

Some estimated item locations may also be removed due to overlap or intersection with other estimated item locations. For example, two items may be stacked one atop another. The estimated item locations for these items may be determined, but these estimated item locations may intersect one another. The lowermost estimated item location may be disregarded, and the upper estimated item location may be extended down to the shelf. For example, a first estimated item location for an upper can of pet food may intersect with a second estimated item location for a lower can of pet food, upon which the upper can rests. In actuality, the two objects do not actually intersect. However, due to processing errors, the first and second estimated item locations may appear to intersect by one quarter of an inch. The second estimated item location may be disregarded or deemed invalid, removing it from consideration for the candidate volume. In some implementations, the first estimated item location may then be stretched or deemed to extend down to the shelf, given the assumption that items are not able to remain above the shelf without support.

In some implementations, two-dimensional (2D) data and three-dimensional (3D) data may be incorporated into trained model data. The 2D data is descriptive of the top of the item while the 3D data provides information about the overall shape and size of the item. This information may be implicitly determined during training of a machine vision module to recognize the item tops. The machine vision module may utilize one or more of a classifier, support vector machine, neural network, and so forth, to recognize the item tops. During training, the machine vision module may be provided with 3D data such as a point cloud or dimensional data of the item while being associated with the 2D data in order to generate trained model data. The trained model data may comprise information indicative of learning by the machine vision module that associates different images of the item as acquired in different poses (such as at different rotations and translations) with the item.

The machine vision module may process the image data using various techniques. For example, the machine vision module may utilize a histogram of oriented gradients (HOG) algorithm to determine the features of items in the image data, and those features may be classified using a support vector machine (SVM). Once classified, the features may be designated as tops, and subsequently associated with the 3D data to determine the estimated item locations.

By using the techniques described herein, operation of the facility may be improved. Details about interactions between users and items in the facility may be quickly and accurately determined. For example, as items are picked, placed, and so forth, information such as inventory levels based on changes in the count of items at the fixtures may be readily determined. As a result, the inventory management system may be able to quickly track what item a user has interacted with, maintain up-to-date item data, and so forth.

Illustrative System

FIG. 1 illustrates an image processing system 100. A fixture 102, such as a shelf 104, is configured to stow some quantity of items 106. In some implementations, a particular portion of a fixture 102, such as lane upon the shelf 104, may store a particular type of item 106. For example, a first lane on the shelf 104 may store cans of cat food while a second lane on the shelf 104 may store cans of dog food. A sensor 108, such as a camera, may be positioned to gather information about the fixture 102. An inventory management system 110 may access image data 112 generated by the sensor 108. Within the image data 112 may be depicted one or more items 106 and their respective item tops 114. The inventory management system 110 may be configured, as described below, to perform various functions such as tracking changes to a quantity on hand of the items 106 at the fixture 102 based on sensor data provided by the sensors 108.

The image data 112 is representative of a two-dimensional array of image elements, or pixels. Each pixel may have one or more value indicative of color, hue, brightness, luminance, and so forth. Each pixel, in turn, is associated with a particular set of coordinates within the array. For example, the pixel at coordinates (201, 473) in the image data 112 may have a red value of 251, green value of 197, and blue value of 101.

The inventory management system 110 may include or have access to a machine vision module 116. The machine vision module 116 may access one or more pieces of the following information during operation.

The item data 118 provides information about a particular type of item 106, including characteristics of that type of item 106 such as physical dimensions, where that type of item 106 is located in the facility, and so forth. For example, the item data 118 may indicate the types and quantities of items 106 that are expected to be stored at that particular fixture 102 such as in a particular lane on a shelf 104. The item data 118 may include two-dimensional (2D) data 120. The 2D data 120 comprises information that is descriptive of one or more 2D representations of the item top 114. In some implementations, the 2D data 120 may be representative of different poses of the item top 114.

The item data 118 may include three-dimensional (3D) data 122. The 3D data 122 comprises information about the item 106. The 3D data 122 may include reference volume data 124 that is indicative of an overall maximum length, width, and height of the item 106. For example, the reference volume data 124 may be analogized to the interior dimensions of a size of box within which a single item 106 may fit snugly. The 3D data 122 may include geometry data 126. The geometry data 126 may comprise information that is descriptive of the particular shape of the item 106. For example, the geometry data 126 may include the overall shape of an item 106, such as a cuboid, sphere, cylinder, and so forth. The geometry data 126 may also include information such as length, width, depth, and so forth, of the item 106. Dimensional information in the geometry data 126 may be measured in pixels, centimeters, inches, arbitrary units, and so forth. The geometry data 126 may be for a single item 106, or a package, kit, or other grouping considered to be a single item 106.

The 3D data 122 may also include point cloud data 128. The point cloud data 128 may comprise information representative of points in a 3D space that describe surface contours of the item 106. For example, the point cloud data 128 may comprise a representation of the item 106 that is generated using a depth camera, laser scanner, or other 3D sensor. In some implementations, the point cloud data 128 or other similar data may be generated using other techniques, such as creating a visual hull from multiple silhouettes of the item 106.

The item data 118 may include one or more fixture identifiers (IDs). The fixture ID is indicative of a particular area or volume of a fixture 102 that is designated for stowage of the type of item 106. For example, a single shelf 104 may be designated as several shelf locations, each with a different fixture ID. Each of the different fixture IDs may be associated with a particular area on the shelf 104 designated for storage of a particular type of item 106. A single type of item 106 may be associated with a particular fixture ID, a plurality of fixture IDs may be associated with the single type of item 106, more than one type of item 106 may be associated with a particular fixture ID, and so forth.

The item data 118 may also include quantity data. The quantity data may comprise a count or value indicative of a number of items 106. The count may be a measured or an estimated value. The quantity data may be associated with a particular fixture ID, for an entire facility, and so forth. For example, the same type of item 106 may be stored at different shelves 104 within the facility. The quantity data may indicate the quantity on hand for each of the different fixtures 102.

The 2D data 120, 3D data 122, and other information about the item 106 or a representative sample thereof may be obtained during a training or intake process in which items 106 are received for use in the facility. For example, during receiving of a type of item, it may be scanned to generate the 2D data 120, the 3D data 122, and so forth.

The item data 118 may include other information, such as an item identifier used to distinguish one type of item 106 from another. For example, the item identifier may include a stock keeping unit (SKU) string, Universal Product Code (UPC) number, and so forth. The items 106 that are of the same type may be referred to by the same item identifier. For example, cans of beef flavor Brand X dog food may be represented by the item identifier value of "9811901181". In other implementations, non-fungible items 106 may each be provided with a unique item identifier, allowing each to be distinguished from one another.

The machine vision module may access physical layout data 130. The physical layout data 130 may comprise information representative of a map or floor plan of the facility with relative positions of fixtures 102, planogram data indicative of how items 106 are to be arranged at the fixtures 102, and so forth.

The physical layout data 130 may associate a particular fixture ID with other information such as physical location data, sensor position data, sensor direction data, sensor identifiers, and so forth. The physical location data provides information about where in the facility objects are, such as the fixture 102, the sensors 108, and so forth. In some implementations, the physical location data may be relative to another object. For example, the physical location data may indicate that the camera 108(1) is associated with the fixture 102.

The physical layout data 130 may provide information indicative of where sensors 108 and fixtures 102 are in the facility with respect to one another, direction the sensor 108 is oriented relative to the fixture 102, and so forth.

The sensor position data may provide information indicative of a position in space of the sensor 108 with respect to a particular fixture 102. For example, the sensor position data may provide one or more of a vector value, scalar value along a predetermined direction, set of coordinates, matrix, and so forth, which indicates a position of the sensor 108.

The sensor direction data provides information indicative of an orientation of the sensor 108 with respect to another object or reference point, such as the fixture 102. For example, the sensor direction data may be indicative of an angle between a centerline of the field-of-view (FOV) of the sensor 108 and a reference line, such as local vertical (up and down). The sensor direction data may be specified in units of degrees, radians, as a decimal value, as a matrix, and so forth.

The physical layout data 130 may include a sensor identifier. The sensor identifier may be used to associate a particular sensor 108 with a particular location within the facility, or to particular fixtures 102. For example, the physical layout data 130 may associate the first camera 108(1) that has a sensor ID of "09042002" with shelf 104(16) on aisle 3.

The physical layout data 130 may include working volume data 132. The working volume data 132 provides information about a working volume of a fixture 102 or portion thereof. The working volume is the volume within which items 106 are expected to be stowed. For example, the working volume may be bounded by a shelf 104(1) at the bottom, another shelf 104(2) up above, and lane dividers on the left and right. The working volume data 132 thus provides information about a volume within which items 106 could possibly be physically present. In some implementations, the working volume may be smaller than that which is physically possible, such as describing a volume within a particular lane where items 106 are supposed to be, as opposed to where they could be.

The physical layout data 130 may include camera data 134. For example, the physical layout data 130 may indicate that camera 108(1) is positioned at a front of fixture 102(37) and pointed such that a centerline of the FOV of the camera 108(1) is looking toward the back of the fixture 102(37) and angled 30 degrees below horizontal. The camera data 134 may include information such as an intrinsic camera matrix (K). The intrinsic camera matrix is indicative of intrinsic parameters of the camera 108(1). These intrinsic parameters may include focal length, image sensor format, principal point, and so forth. In some implementations, the camera data 134 may include extrinsic camera parameters that describe a relationship between the sensor 108 camera and an object such as the item 106. The extrinsic camera parameters may include a rotation matrix R and a translation T between camera coordinates in a camera-centered coordinate system and real-world coordinates, such as relative to the fixture 102.

The machine vision module 116 may access trained model data 136 during operation. The trained model data 136 may be used to recognize or distinguish between individual items 106, determine the item top 114 in the image data 112, and so forth. For example, the machine vision module 116 may utilize a convolutional neural network (CNN) to detect individual items 106 in the image data 112. The CNN may have been trained using image data 112. The trained model data 136 may be trained using a variety of different poses of the camera 108(1) relative to the item 106.

In other implementations, other types of techniques may be used to determine the presence of an item 106 as represented within the image data 112. For example, a histogram of oriented gradients (HOG) algorithm, a second order function (SOF) algorithm, a support vector machine (SVM), and so forth, may be utilized to process the image data 112 and generate data indicative of one or more features in the image data 112. The HOG algorithm may be preferred in situations where the items 106 are relatively rigid and maintain a reasonably consistent shape over time. For example, where the item 106 comprises a rigid container, such as a steel can, the image data 112 may be processed using a HOG algorithm to detect one or more occurrences of the type of item 106 in the image data 112. The HOG algorithm may be implemented by using the HOGDescriptor function of OpenCV. The HOGDescriptor function utilizes an implementation of the HOG algorithm described in "Histograms of Oriented Gradients for Human Detection" by Navneet Dalal and Bill Triggs. The techniques described by Dalal and Triggs may be applied to non-human detection, such as the items 106. In some implementations, different techniques may be combined. For example, the HOG algorithm may be used to determine features, which may then be classified using a SVM. For example, the CvSVM functions of OpenCV may be utilized. The data indicative of the one or more features as produced by the HOG algorithm may be processed by the SVM to generate data indicative of a presence of at least one item 106 or a portion thereof, such as a top of an item 106. For example, the SVM may be used to recognize that a type of item 106, or portion thereof, is present in the image data 112.

The SVM may be trained, such as by using the CvSVM::train function of OpenCV. Additional details regarding SVMs may be found at "LIBSVM: A Library for Support Vector Machines" by Chih-Chung Chang and Chih-Jen Lin. Once the items 106 in the image data 112 have been classified or recognized as being a particular type of item 106, the number of occurrences may be counted by the machine vision module 116 and used to generate output.

During operation, the machine vision module 116, or other modules, may determine one or more of an estimated top location 138, an estimated item location 140, or a candidate volume 142. The estimated top location 138 provides information indicative of the item top 114 in 3D space. In some implementations, the estimated top location 138 may comprise a plurality of points in 3D space relative to the fixture 102.

The estimated item location 140 comprises information indicative of where in 3D space the item 106 is located. For example, the estimated item location 140 may be a bounding box that describes a volume within which the item 106 has been determined to be based on the image data 112 as processed by the machine vision module 116.

The machine vision module 116 or other modules may process one or more of the estimated top locations 138 or the estimated item locations 140 to determine if the detection of an item 106 is valid or invalid. For example, an estimated item location 140 that extends beyond the working volume as specified in the working volume data 132 may be deemed invalid and not used for subsequent operations. Continuing this example, the estimated item location 140 is invalid because the estimated item location 140 would intersect a wall of the fixture 102 or otherwise appear in an impossible place.

The machine vision module 116 may also deem an estimated item location 140 as invalid if it intersects another estimated item location 140 beyond a threshold amount. The estimated item locations 140 may have some variability. As a result, two items 106 that are stacked one atop each other may not physically intersect, but may have respective estimated item locations 140 that do intersect. The machine vision module 116 may assess the intersection and determine if one or more of the estimated item locations 140 should be deemed invalid. For example, if the intersection exceeds a threshold amount of overlap, one of the estimated item locations 140 may be discarded. In another example, if the displacement between the two estimated item locations 140 is less than a threshold distance, both of the estimated item locations 140 may be deemed valid.

Returning to the example of the two stacked items 106, the relative position of one estimated item location 140 to another may be used to determine which estimated item location 140 to disregard. In one implementation, a lower estimated item location 140, that is the one which is closest to the shelf 104, may be deemed invalid. By deeming this lower estimated item location 140 invalid and an upper estimated item location 140 as valid, the system avoids potential double counting situations. A bottom boundary of the upper estimated item location 140 may then be extended down to the shelf 104. Continuing the example, the bottom estimated item location 140 is disregarded, and the upper estimated item location 140 is extended so it has a height that extends from the shelf 104 to the top of the upper estimated item location 140.

The machine vision module 116 may determine a candidate volume 142 of the items 106. For example, the candidate volume 142 may comprise a sum of the estimated item locations 140 that are deemed valid.

The machine vision module 116 may utilize, at least in part, one or more tools available in the OpenCV library as developed by Intel Corporation of Santa Clara, Calif., USA; MATLAB as developed by Math Works, Inc. of Natick, Mass., USA; the Machine Vision Toolbox for Matlab (MVTB); and so forth.

The machine vision module 116 may determine output data 144 using the information described above. The output data 144 may result from processing of the image data 112 by the machine vision module 116. For example, the output data 144 may comprise one or more of item count data 146 or item identification data 148. The item count data 146 may comprise data indicative of a quantity of items 106 at the fixture 102 or at a portion of the fixture 102. In some implementations, the item count data 146 provide different types of information. For example, the item count data 146 may be specific to a particular type of item 106. In another example, the item count data 146 may be a combined count of items 106 of different types. The item identification data 148 may comprise information indicative of a particular type of item 106. For example, the item identification data 148 may indicate that a particular item 106 in the image data 112 is a particular type of pet food, based at least in part on the appearance of the item 106 in the image data 112.

In one implementation, the candidate volume 142 and the reference volume data 124 may be used to determine the item count data 146. For example, the candidate volume 142 may be divided by the reference volume data 124 to determine the item count data 146. In other examples, to determine the item count data 146, the candidate volume 142 may be processed to determine the number of items 106 as described by the reference volume data 124 may fit within the candidate volume 142.

As described below in more detail with regard to FIG. 6, the inventory management system 110 may utilize the output data 144 to generate interaction data. For example, item count data 146 may be determined based on image data 112 acquired before and after a user approaches the fixture 102. The items 106 appearing in the corresponding image data 112 for the before-and-after images may be counted to generate before item count data 146 and after item count data 146. By subtracting the value of the before item count data 146 from the after item count data 146, a differential indicative of a quantity of items 106 picked or placed may be determined. This information may be used by the inventory management system 110 to adjust the quantity of the items 106 on hand at the fixture 102.

Figure 2:
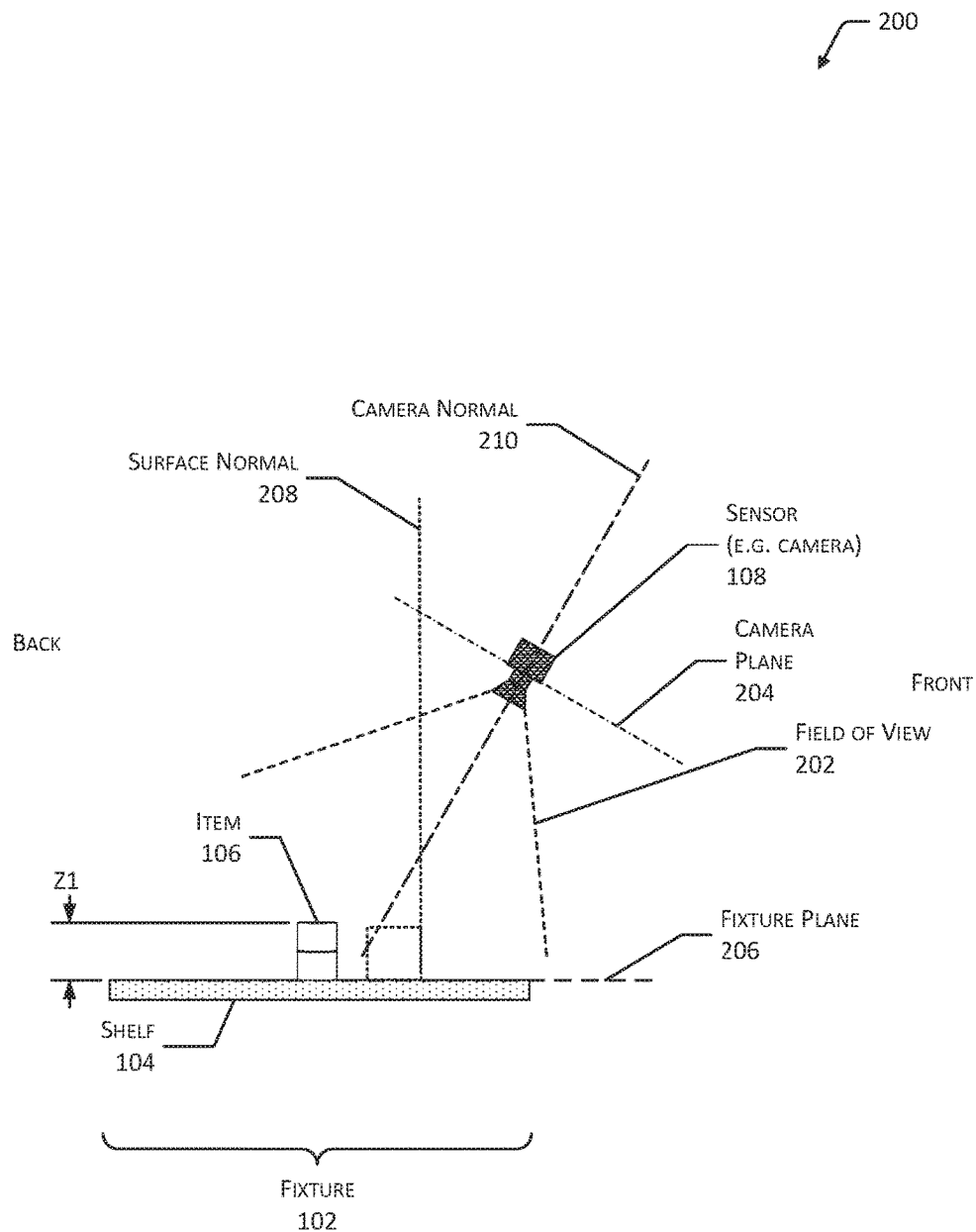
FIG. 2 illustrates a side view of a fixture and a relative position and direction of a camera relative to the fixture, according to some implementations.

FIG. 2 illustrates a side view 200 of a fixture 102 comprising a shelf 104 and a relative position and direction of a sensor 108 (such as a camera 108(1)) with respect to the shelf 104, according to some implementations. As illustrated here, the sensor 108 is positioned proximate to a front of the shelf 104 and above the shelf 104. For example, the sensor 108 may be fixedly mounted to a support structure above the fixture 102 and proximate to a front of the fixture 102. The sensor 108 exhibits a field-of-view (FOV) 202. The sensor 108 in this figure is directed such that a centerline of the FOV 202 is pointed at a generally oblique angle relative to the shelf 104, downward and toward a back of the shelf 104.

The sensor 108 includes a camera plane 204. The camera plane 204 may comprise a plane within which the image data 112 exists. For example, the camera plane 204 may comprise a plane extending through the charge coupled device (CCD) or complementary metal oxide semiconductor (CMOS) image sensor within the sensor 108. In some implementations, the centerline of the FOV 202 of the sensor 108 may be a surface normal relative to, and centered within, the camera plane 204.

Depicted is an overall height Z1 of items 106 relative to the shelf 104. As described above, items 106 may be stacked, changing the overall height Z1.

A fixture plane 206 extends through a surface of the shelf 104. In implementations where the fixture 102 comprises hangers, the fixture plane 206 may extend through other points corresponding to items 106 suspended by the hanger(s).

A surface normal 208 is depicted as a line that is orthogonal to a plane from which it originates, such as the fixture plane 206. A camera normal 210 is depicted as a line orthogonal to the camera plane 204. The surface normal 208 and the camera normal 210 may form a non-zero angle as shown here, that provides for a FOV 202 resulting in obliquely acquired image data 112. The image data 112 acquired in this configuration with the sensor 108(1) at an oblique angle produces a foreshortened image of the fixture 102.

In other implementations the camera normal 210 may be parallel to the surface normal 208. For example, the camera 108 may be located above the shelf 104 and looking straight down.

Figure 3:
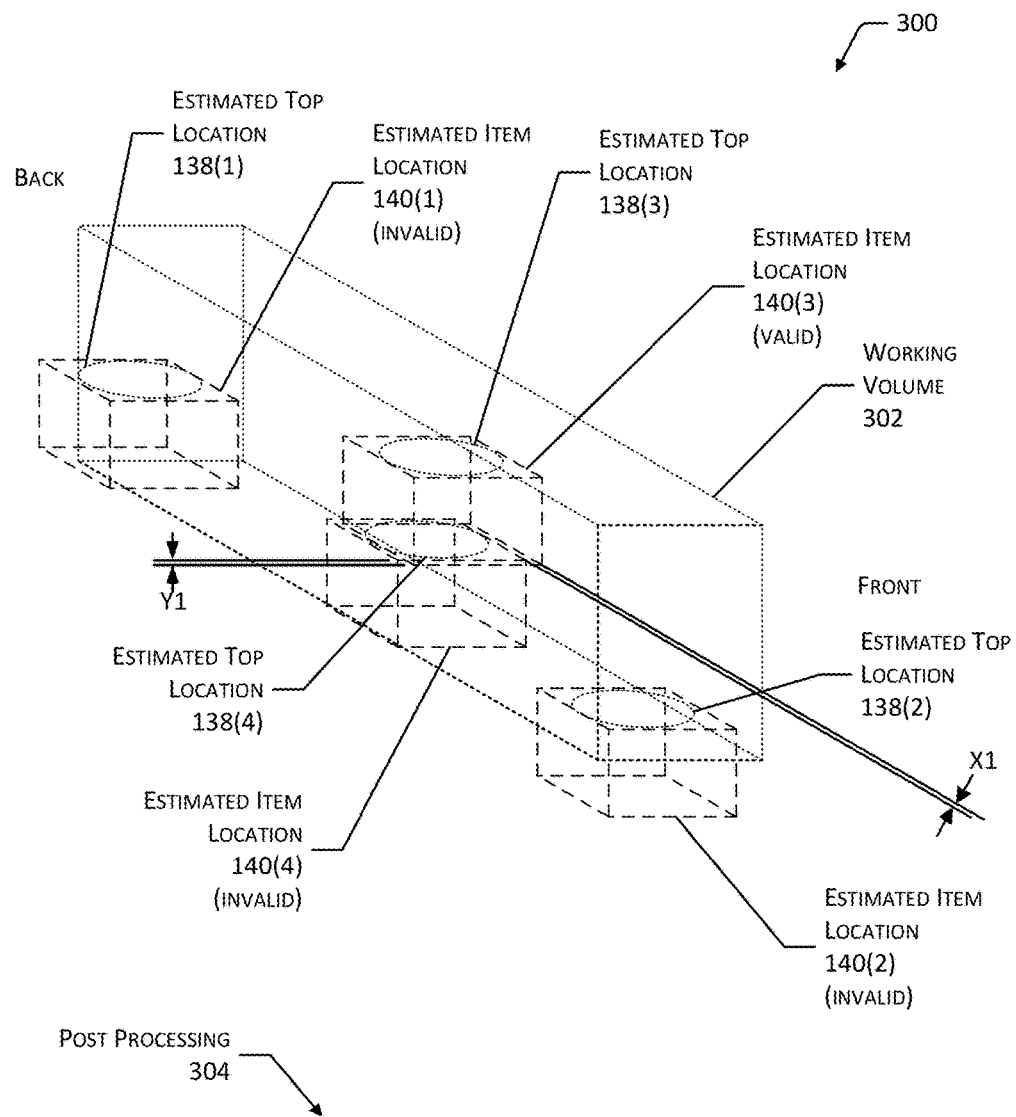
FIG. 3 illustrates an isometric view of a portion of a working volume of a fixture in which items may be stowed and estimated item locations, according to some implementations.
Figure 3:
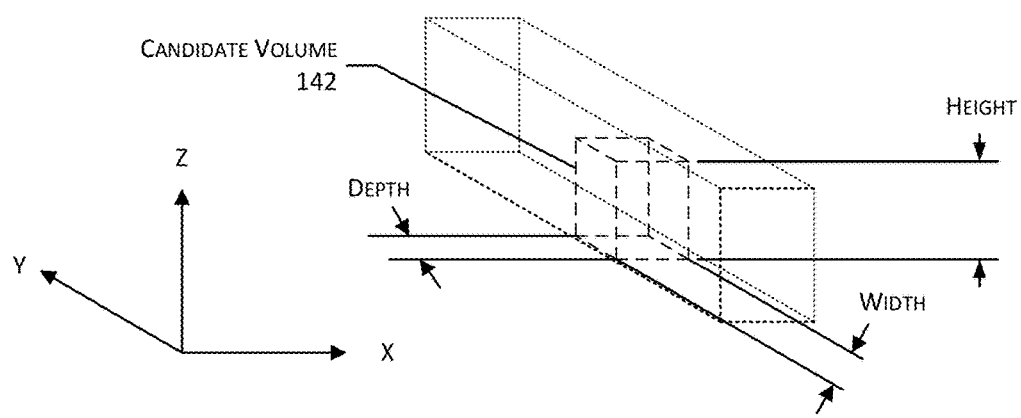

FIG. 3 illustrates an isometric view 300 of a portion of a working volume of a fixture 102 in which items 106 may be stowed, the estimated top locations 138, and estimated item locations 140 associated with the estimated top locations 138 indicated by the machine vision module 116, according to some implementations.

In this illustration, a working volume 302 is depicted. As described above, the working volume 302 comprises a volume within which the items 106 may be placed. The working volume 302 may be constrained by portions of the fixture 102. For example, the fixture plane 206 of the shelf 104 sets a lower boundary for the working volume 302 as items 106 are not seemed to be able to penetrate the shelf 104. Similarly, other features of the fixture 102 such as another shelf 104 above, lane dividers, and so forth, may specify the other sides of the working volume 302. The working volume 302 may be associated with a particular type of item, and in some implementations may vary depending on the type of item. For example, the working volume 302 may comprise a volume associated with a lane within which the type of item is stowed and within which items may be stored and not intrude on components of the shelf and adjacent lanes.

While the working volume 302 is depicted as being cubical, the working volume 302 may encompass other shapes, either regular or irregular. In one implementation, the working volume 302 may exclude buffer space, overhead space, and so forth that is associated with normal handling of the items stowed therein. For example, when the spacing between a supporting shelf 104 and an overhead shelf 104 is 13 inches, and the items stowed on the supporting shelf are each 5 inches tall and may be stacked double to a total height of 10 inches tall, the working volume 302 may exclude the uppermost 2 inches, allowing for a 1 inch buffer. In other implementations, the working volume 302 may include buffer space, overhead space, and so forth.

Depicted in this figure are four estimated top locations 138(1), 138(2), 138(3), and 138(4) and the estimated item locations 140(1), 140(2), 140(3), and 140(4) associated with the respective estimated top locations 138. As described above, the estimated item locations 140 may be determined by the machine vision module 116 based on the estimated top locations 138. In some situations, the machine vision module 116 may incorrectly detect an item top 114 where none exists, mistake another set of features for those of an item top 114, and so forth. As a result, some estimated item locations 140 may be incorrect. For example, as depicted here, the estimated item location 140(1) extends from within the working volume 302 to outside the working volume 302, apparently cutting through a back wall of the fixture 102. However, if the back wall of the fixture 102 is impermeable to the item 106, this is not possible. As a result, the estimated item location 140(1) is deemed invalid, and is disregarded from further consideration.

In another example, the estimated item location 140(2) indicates the presence of an item 106 which is penetrating the shelf 104. As described above, this is deemed to be invalid because the shelf 104 is considered impermeable to the item 106.

The estimated item location 140(3) is located above the estimated item location 140(4), with the two volumes intersecting slightly. Depicted are differences X1 and Y1 (Z1 is not depicted for clarity) between similar points on the two volumes.

In some implementations, if the intersection exceeds a threshold value, one of the one or more intersecting estimated item locations 140 may be disregarded or otherwise removed from further consideration. For example, an uppermost (relative to the shelf 104) estimated item location 140 may be retained while lower estimated item locations 140 are disregarded. The remaining estimated item location 140 may then be extended downwards to the surface of the fixture 102, such as to the fixture plane 206. This selection reduces the potential for over counting. The threshold values allow for variations that may occur due to operation of the image processing system 100. For example, the threshold values may allow for an intersection of less than 5 millimeters along any of the X, Y, or Z axes to be disregarded.

Also depicted in FIG. 3 is a post processing 304 view illustrating the candidate volume 142 that incorporates the extended estimated item location 140(3) that was deemed valid, with the other invalid estimated item locations 140(1), 140(2), and 140(3) having been suppressed.

Other estimated dimensions of the candidate volume may be determined or otherwise considered. For example, one or more of a depth, height, or width of the candidate volume 142 may be calculated. In some implementations these dimensions may be used to determine the quantity of the type of item at the fixture. For example, the height of the candidate volume 142 may be compared to a known height of the type of item as indicated by the 3D data 122. For example, given a height of the candidate volume 142 of 10 inches, and the height of the type of item indicated by the 3D data 122 is 3 inches, the quantity may be determined to be 3.

Figure 4:
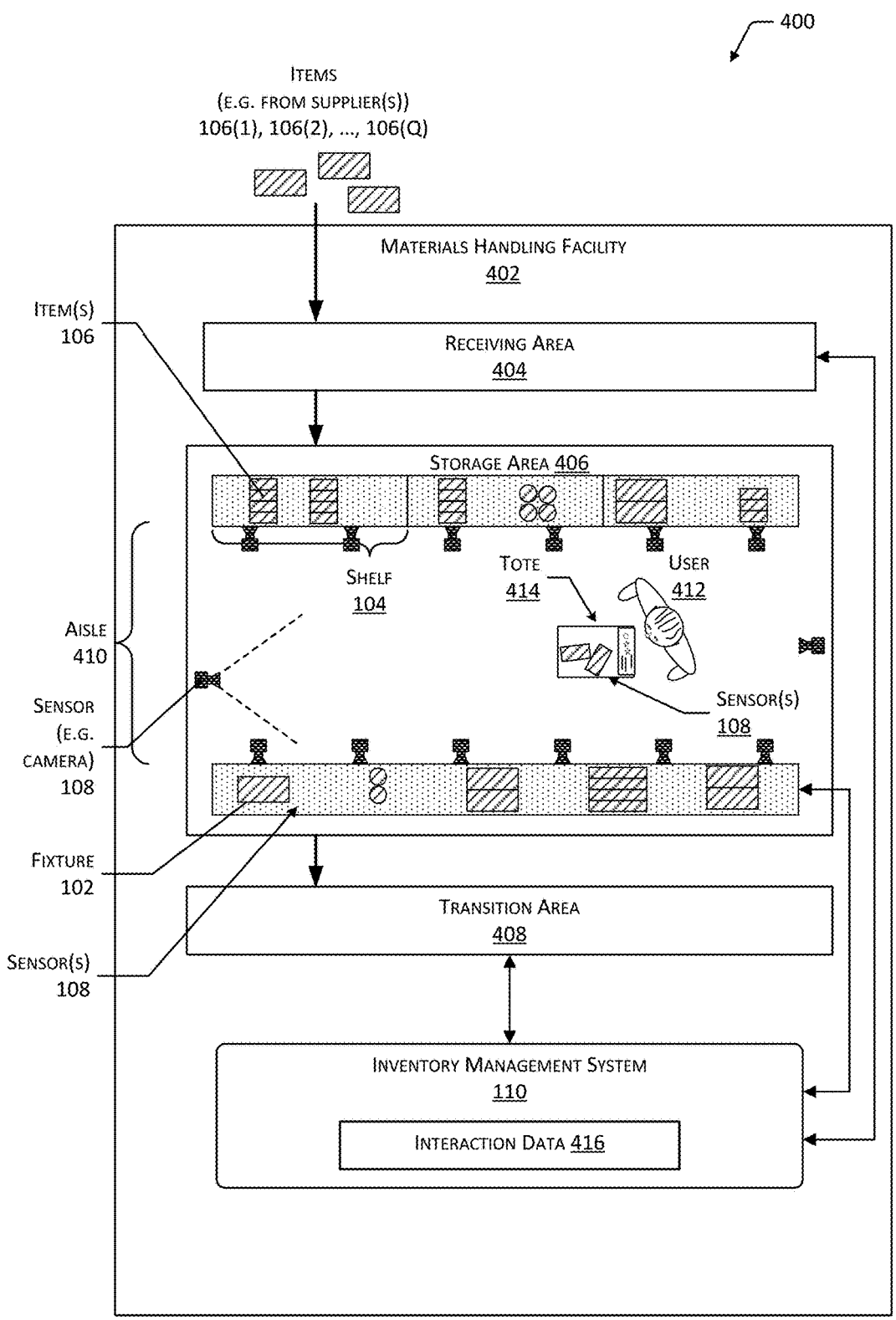
FIG. 4 is a block diagram illustrating a materials handling facility (facility) using the image processing system, according to some implementations.

FIG. 4 is a block diagram 400 illustrating a materials handling facility (facility) 402 using the image processing system 100, according to some implementations. A facility 402 comprises one or more physical structures or areas within which one or more items 106(1), 106(2), ..., 106(Q) may be held. As used in this disclosure, letters in parenthesis such as "(Q)" indicate an integer value greater than or equal to zero. The items 106 comprise physical goods, such as books, pharmaceuticals, repair parts, electronic gear, and so forth.

The facility 402 may include one or more areas designated for different functions with regard to inventory handling. In this illustration, the facility 402 includes a receiving area 404, a storage area 406, and a transition area 408.

The receiving area 404 may be configured to accept items 106, such as from suppliers, for intake into the facility 402. For example, the receiving area 404 may include a loading dock at which trucks or other freight conveyances unload the items 106.

The storage area 406 is configured to store the items 106. The storage area 406 may be arranged in various physical configurations. In one implementation, the storage area 406 may include one or more aisles 410. The aisle 410 may be configured with, or defined by, fixtures 102 on one or both sides of the aisle 410. The fixtures 102 may include one or more of a shelf 104, a rack, a case, a cabinet, a bin, a floor location, or other suitable storage mechanism for holding, supporting, or storing the items 106. The fixtures 102 may be affixed to the floor or another portion of the structure of the facility 402. The fixtures 102 may also be movable such that the arrangements of aisles 410 may be reconfigurable. In some implementations, the fixtures 102 may be configured to move independently of an outside operator. For example, the fixtures 102 may comprise a rack with a power source and a motor, operable by a computing device to allow the rack to move from one location within the facility 402 to another.

One or more users 412(1), 412(2), ..., 412(U) and totes 414(1), 414(2), ..., 414(T) or other material handling apparatus may move within the facility 402. For example, the user 412 may move about within the facility 402 to pick or place the items 106 in various fixtures 102, placing them on the tote 414 for ease of transport. The tote 414 is configured to carry or otherwise transport one or more items 106. For example, the tote 414 may include a basket, cart, bag, bin, and so forth. In other implementations, other material handling apparatuses such as robots, forklifts, cranes, aerial drones, and so forth, may move about the facility 402 picking, placing, or otherwise moving the items 106. For example, a robot may pick an item 106 from a first fixture 102(1) and move the item 106 to a second fixture 102(2).

One or more sensors 108 may be configured to acquire information in the facility 402. The sensors 108 may include, but are not limited to, cameras 108(1), depth sensors 108(2), weight sensors 108(6), optical sensor arrays 108(13), proximity sensors 108(14), and so forth. The sensors 108 may be stationary or mobile, relative to the facility 402. For example, the fixtures 102 may contain weight sensors 108(6) to acquire weight sensor data of items 106 stowed therein, cameras 108(1) to acquire images of picking or placement of items 106 on shelves 104, optical sensor arrays 108(13) to detect shadows of the user's 412 hands at the fixtures 102, and so forth. In another example, the facility 402 may include cameras 108(1) to obtain images of the user 412 or other objects in the facility 402. The sensors 108 are discussed in more detail below with regard to FIG. 5.

While the storage area 406 is depicted as having one or more aisles 410, fixtures 102 storing the items 106, sensors 108, and so forth, it is understood that the receiving area 404, the transition area 408, or other areas of the facility 402 may be similarly equipped. Furthermore, the arrangement of the various areas within the facility 402 is depicted functionally rather than schematically. For example, in some implementations, multiple different receiving areas 404, storage areas 406, and transition areas 408 may be interspersed rather than segregated in the facility 402.

The facility 402 may include, or be coupled to, an inventory management system 110. The inventory management system 110 is configured to interact with users 412 or devices such as sensors 108, robots, material handling equipment, computing devices, and so forth, in one or more of the receiving area 404, the storage area 406, or the transition area 408.

During operation of the facility 402, the sensors 108 may be configured to provide sensor data, or information based on the sensor data, to the inventory management system 110. The sensor data may include image data 112, non-image data, weight sensor data obtained from weight sensors 108(6), and so forth. The sensors 108 are described in more detail below with regard to FIG. 5.

The inventory management system 110 or other systems may use the sensor data to track the location of objects within the facility 402, movement of the objects, or provide other functionality. Objects may include, but are not limited to, items 106, users 412, totes 414, and so forth. For example, a series of images acquired by the camera 108(1) may indicate removal by the user 412 of an item 106 from a particular location on the fixture 102 and placement of the item 106 on or at least partially within the tote 414.

The facility 402 may be configured to receive different kinds of items 106 from various suppliers and to store them until a customer orders or retrieves one or more of the items 106. A general flow of items 106 through the facility 402 is indicated by the arrows of FIG. 4. Specifically, as illustrated in this example, items 106 may be received from one or more suppliers, such as manufacturers, distributors, wholesalers, and so forth, at the receiving area 404. In various implementations, the items 106 may include merchandise, commodities, perishables, or any suitable type of item 106, depending on the nature of the enterprise that operates the facility 402.

Upon being received from a supplier at the receiving area 404, the items 106 may be prepared for storage in the storage area 406. For example, in some implementations, items 106 may be unpacked or otherwise rearranged. The inventory management system 110 may include one or more software applications executing on a computer system to provide inventory management functions. These inventory management functions may include maintaining information indicative of the type, quantity, condition, cost, location, weight, or any other suitable parameters with respect to the items 106. The items 106 may be stocked, managed, or dispensed in terms of countable units, individual units, or multiple units, such as packages, cartons, crates, pallets, or other suitable aggregations. Alternatively, some items 106, such as bulk products, commodities, and so forth, may be stored in continuous or arbitrarily divisible amounts that may not be inherently organized into countable units. Such items 106 may be managed in terms of a measurable quantity such as units of length, area, volume, weight, time, duration, or other dimensional properties characterized by units of measurement. Generally speaking, a quantity of an item 106 may refer to either a countable number of individual or aggregate units of an item 106 or a measurable amount of an item 106, as appropriate.

After arriving through the receiving area 404, items 106 may be stored within the storage area 406. In some implementations, like items 106 may be stored or displayed together in the fixtures 102 such as in bins, on shelves 104, hanging from pegboards, and so forth. In this implementation, all items 106 of a given kind are stored in one fixture 102. In other implementations, like items 106 may be stored in different fixtures 102. For example, to optimize retrieval of certain items 106 having frequent turnover within a large physical facility 402, those items 106 may be stored in several different fixtures 102 to reduce congestion that might occur at a single fixture 102.

When a customer order specifying one or more items 106 is received, or as a user 412 progresses through the facility 402, the corresponding items 106 may be selected or "picked" from the fixtures 102 containing those items 106. In various implementations, item picking may range from manual to completely automated picking. For example, in one implementation, a user 412 may have a list of items 106 they desire and may progress through the facility 402 picking items 106 from fixtures 102 within the storage area 406 and placing those items 106 into a tote 414. In other implementations, employees of the facility 402 may pick items 106 using written or electronic pick lists derived from customer orders. These picked items 106 may be placed into the tote 414 as the employee progresses through the facility 402.

After items 106 have been picked, the items 106 may be processed at a transition area 408. The transition area 408 may be any designated area within the facility 402 where items 106 are transitioned from one location to another or from one entity to another. For example, the transition area 408 may be a packing station within the facility 402. When the item 106 arrives at the transition area 408, the item 106 may be transitioned from the storage area 406 to the packing station. Information about the transition may be maintained by the inventory management system 110.

In another example, if the items 106 are departing the facility 402, a list of the items 106 may be obtained and used by the inventory management system 110 to transition responsibility for, or custody of, the items 106 from the facility 402 to another entity. For example, a carrier may accept the items 106 for transport with that carrier accepting responsibility for the items 106 indicated in the list. In another example, a user 412 may purchase or rent the items 106 and remove the items 106 from the facility 402. During use of the facility 402, the user 412 may move about the facility 402 to perform various tasks, such as picking or placing the items 106 in the fixtures 102.

To facilitate operation of the facility 402, the inventory management system 110 is configured to use the sensor data including the image data 112 and other information such as the item data 118, the physical layout data 130, the trained model data 136, and so forth, to generate interaction data 416. For example, the image data 112 may be used to determine a count of items 106 on hand at a particular fixture 102 at a first time and a second time. A change in the count may be used to determine a pick or a place of items 106.

The interaction data 416 may provide information about an interaction, such as a pick of an item 106 from the fixture 102, a place of an item 106 to the fixture 102, a touch made to an item 106 at the fixture 102, a gesture associated with an item 106 at the fixture 102, and so forth. The interaction data 416 may include one or more of the type of interaction, interaction location identifier indicative of where from the fixture 102 the interaction took place, item identifier, quantity change to the item 106, user identifier, and so forth. The interaction data 416 may then be used to further update the item data 118. For example, the quantity of items 106 on hand at a particular lane on the shelf 104 may be changed based on an interaction that picks or places one or more items 106.

In some implementations, a single fixture 102 such as a shelf 104 may stow several different types of items 106, with each type of item 106 arranged in columns on the shelf 104. The inventory management system 110 may use the image data 112 to count the items 106, identify the items 106, and so forth. The physical layout data 130 may be used to associate a particular sensor 108 with a particular fixture 102, or portion thereof such as a lane.

The inventory management system 110 may combine or otherwise utilize data from different sensors 108 of different types. For example, weight data obtained from weight sensors 108(6) at the fixture 102 may be used instead of, or in conjunction with, the image data 112 to determine the interaction data 416.

In some implementations, items 106 may be processed, such as at the receiving area 404, to generate at least a portion of the item data 118. For example, an item 106 not previously stored by the inventory management system 110 may be measured to determine geometry data such as external dimensions such as height, width, and shape, the item 106 may be assigned to a particular fixture 102, and so forth, as part of a process to receive the item 106 into the facility 402. Continuing the example, the item data 118 generated may include acquiring the height Z1 of a single item 106, information about the shape of that item 106 in two or three dimensions, and so forth.

By using the image data 112, the inventory management system 110 may maintain item data 118 such as inventory levels of a particular item 106 at a particular fixture 102, generate billing information without manual intervention by a user 412, or provide other functions. For example, the user 412 may pick an item 106 from the fixture 102. Using the interaction data 416 based on the image data 112 and in conjunction with the item data 118, the inventory management system 110 may correctly determine that a quantity of one can of dog food has been picked, and bill the user 412 accordingly for the sale price of the item 106. In some implementations, the interaction data 416 may be generated using the data from other sensors 108, such as weight sensors 108(6), RFID readers (108)(8), and so forth.

Figure 5:
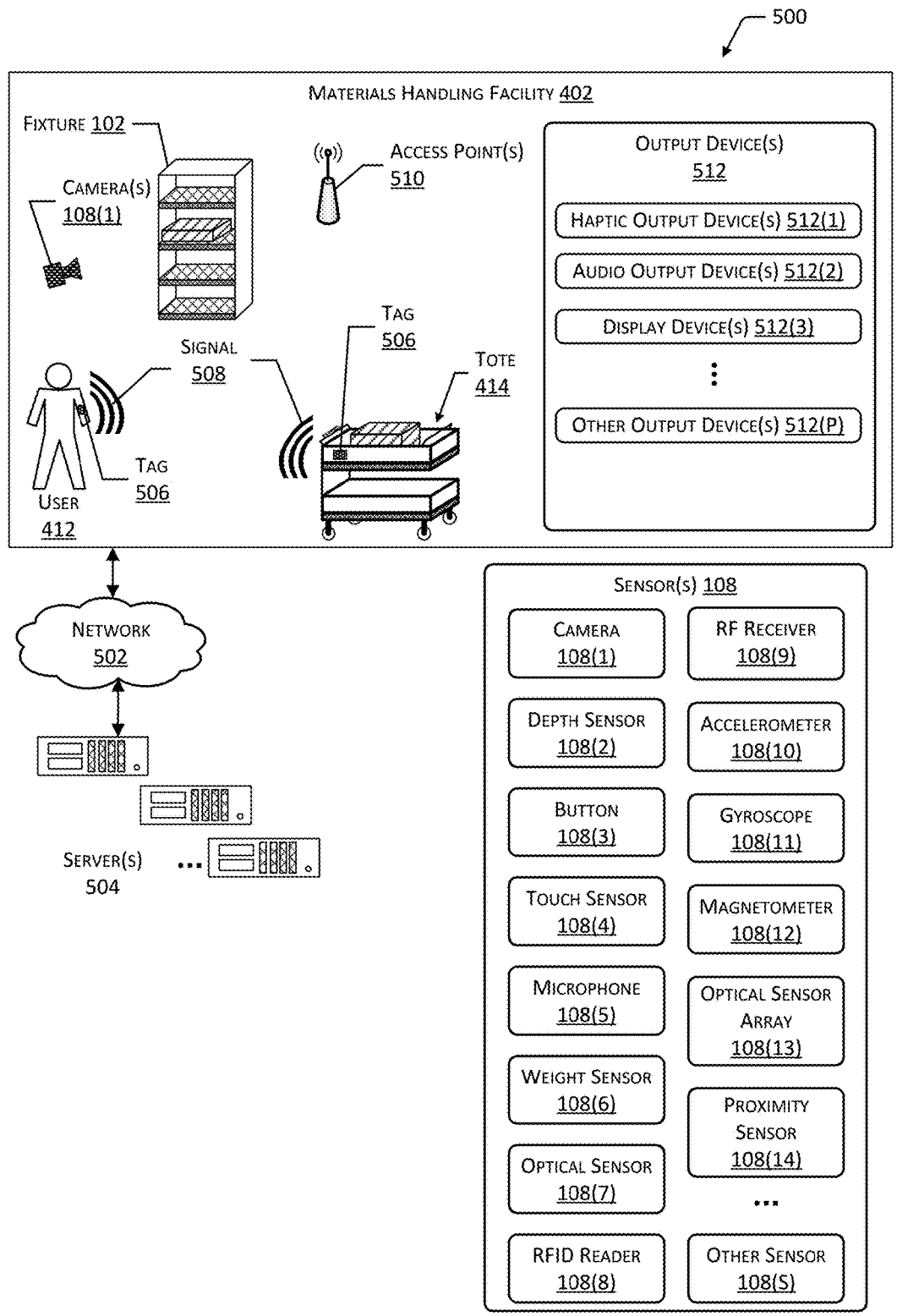
FIG. 5 is a block diagram illustrating additional details of the facility, according to some implementations.

FIG. 5 is a block diagram 500 illustrating additional details of the facility 402, according to some implementations. The facility 402 may be connected to one or more networks 502, which in turn connect to one or more servers 504. The network 502 may include private networks such as an institutional or personal intranet, public networks such as the Internet, or a combination thereof. The network 502 may utilize wired technologies (e.g., wires, fiber optic cables, and so forth), wireless technologies (e.g., radio frequency, infrared, acoustic, optical, and so forth), or other connection technologies. The network 502 is representative of any type of communication network, including one or more of data networks or voice networks. The network 502 may be implemented using wired infrastructure (e.g., copper cable, fiber optic cable, and so forth), a wireless infrastructure (e.g., cellular, microwave, satellite, and so forth), or other connection technologies.

The servers 504 may be configured to execute one or more modules or software applications associated with the inventory management system 110 or other systems. While the servers 504 are illustrated as being in a location outside of the facility 402, in other implementations, at least a portion of the servers 504 may be located at the facility 402. The servers 504 are discussed in more detail below with regard to FIG. 6.

The users 412, the totes 414, or other objects in the facility 402 may be equipped with one or more tags 506. The tags 506 may be configured to emit a signal 508. In one implementation, the tag 506 may be a radio frequency identification (RFID) tag 506 configured to emit a RF signal 508 upon activation by an external signal. For example, the external signal may comprise a radio frequency signal or a magnetic field configured to energize or activate the RFID tag 506. In another implementation, the tag 506 may comprise a transmitter and a power source configured to power the transmitter. For example, the tag 506 may comprise a Bluetooth Low Energy (BLE) transmitter and battery. In other implementations, the tag 506 may use other techniques to indicate presence of the tag 506. For example, an acoustic tag 506 may be configured to generate an ultrasonic signal 508, which is detected by corresponding acoustic receivers. In yet another implementation, the tag 506 may be configured to emit an optical signal 508.

The inventory management system 110 may be configured to use the tags 506 for one or more of identification of the object, determining a location of the object, and so forth. For example, the users 412 may wear tags 506, the totes 414 may have tags 506 affixed, and so forth, which may be read and, based at least in part on signal strength, used to determine identity and location.

Generally, the inventory management system 110 or other systems associated with the facility 402 may include any number and combination of input components, output components, and servers 504.

The one or more sensors 108 may be arranged at one or more locations within the facility 402. For example, the sensors 108 may be mounted on or within a floor, wall, at a ceiling, at a fixture 102, on a tote 414, may be carried or worn by a user 412, and so forth.

The sensors 108 may include one or more cameras 108(1) or other imaging sensors. The one or more cameras 108(1) may include imaging sensors configured to acquire images of a scene. The cameras 108(1) are configured to detect light in one or more wavelengths including, but not limited to, terahertz, infrared, visible, ultraviolet, and so forth. The cameras 108(1) may comprise charge coupled devices (CCD), complementary metal oxide semiconductor (CMOS) devices, microbolometers, and so forth. The inventory management system 110 may use image data 112 acquired by the cameras 108(1) during operation of the facility 402. For example, the inventory management system 110 may identify items 106, users 412, totes 414, and so forth, based at least in part on their appearance within the image data 112 acquired by the cameras 108(1). The cameras 108(1) may be mounted in various locations within the facility 402. For example, cameras 108(1) may be mounted overhead, on fixtures 102, may be worn or carried by users 412, may be affixed to totes 414, and so forth.

One or more depth sensors 108(2) may also be included in the sensors 108. The depth sensors 108(2) are configured to acquire spatial or three-dimensional (3D) data, such as depth information, about objects within a FOV. The depth sensors 108(2) may include range cameras, lidar systems, sonar systems, radar systems, structured light systems, stereo vision systems, optical interferometry systems, and so forth. The inventory management system 110 may use the 3D data acquired by the depth sensors 108(2) to identify objects, determine a location of an object in 3D real space, and so forth. In some implementations, the depth sensors 108(2) may be used to generate the 3D data 122.

One or more buttons 108(3) may be configured to accept input from the user 412. The buttons 108(3) may comprise mechanical, capacitive, optical, or other mechanisms. For example, the buttons 108(3) may comprise mechanical switches configured to accept an applied force from a touch of the user 412 to generate an input signal. The inventory management system 110 may use data from the buttons 108(3) to receive information from the user 412. For example, the tote 414 may be configured with a button 108(3) to accept input from the user 412 and send information indicative of the input to the inventory management system 110.

The sensors 108 may include one or more touch sensors 108(4). The touch sensors 108(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 110 may use data from the touch sensors 108(4) to receive information from the user 412. For example, the touch sensor 108(4) may be integrated with the tote 414 to provide a touchscreen with which the user 412 may select from a menu one or more particular items 106 for picking, enter a manual count of items 106 at a fixture 102, and so forth.

One or more microphones 108(5) may be configured to acquire information indicative of sound present in the environment. In some implementations, arrays of microphones 108(5) may be used. These arrays may implement beamforming techniques to provide for directionality of gain. The inventory management system 110 may use the one or more microphones 108(5) to acquire information from acoustic tags 506, accept voice input from the users 412, determine ambient noise level, and so forth.

One or more weight sensors 108(6) are configured to measure the weight of a load, such as the item 106, the tote 414, or other objects. The weight sensors 108(6) may be configured to measure the weight of the load at one or more of the fixtures 102, the tote 414, on the floor of the facility 402, and so forth. For example, the shelf 104 may include a plurality of lanes or platforms, with one or more weight sensors 108(6) beneath each one to provide weight sensor data about an individual lane or platform. The weight sensors 108(6) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 108(6) may operate as transducers that generate one or more signals based on an applied force, such as that of the load due to gravity. For example, the weight sensor 108(6) may comprise a load cell having a strain gauge and a structural member that deforms slightly when weight is applied. By measuring a change in the electrical characteristic of the strain gauge, such as capacitance or resistance, the weight may be determined. In another example, the weight sensor 108(6) may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 110 may use the data acquired by the weight sensors 108(6) to identify an object, determine a change in the quantity of objects, determine a location of an object, maintain shipping records, and so forth.

The sensors 108 may include one or more optical sensors 108(7). The optical sensors 108(7) may be configured to provide data indicative of one or more of color or intensity of light impinging thereupon. For example, the optical sensor 108(7) may comprise a photodiode and associated circuitry configured to generate a signal or data indicative of an incident flux of photons. As described below, the optical sensor array 108(13) may comprise a plurality of the optical sensors 108(7). For example, the optical sensor array 108 (13) may comprise an array of ambient light sensors such as the ISL76683 as provided by Intersil Corporation of Milpitas, Calif., USA, or the MAX44009 as provided by Maxim Integrated of San Jose, Calif., USA. In other implementations, other optical sensors 108(7) may be used. The optical sensors 108(7) may be sensitive to one or more of infrared light, visible light, or ultraviolet light. For example, the optical sensors 108(7) may be sensitive to infrared light, and infrared light sources such as LEDs may provide illumination.

The optical sensors 108(7) may include photodiodes, photoresistors, photovoltaic cells, quantum dot photoconductors, bolometers, pyroelectric infrared detectors, and so forth. For example, the optical sensor 108(7) may use germanium photodiodes to detect infrared light.

One or more radio frequency identification (RFID) readers 108(8), near field communication (NFC) systems, and so forth, may be included as sensors 108. For example, the RFID readers 108(8) may be configured to read the RF tags 506. Information acquired by the RFID reader 108(8) may be used by the inventory management system 110 to identify an object associated with the RF tag 506 such as the item 106, the user 412, the tote 414, and so forth. For example, based on information from the RFID readers 108(8) detecting the RF tag 506 at different times and RFID readers 108(8) having different locations in the facility 402, a velocity of the RF tag 506 may be determined.

One or more RF receivers 108(9) may also be included as sensors 108. In some implementations, the RF receivers 108(9) may be part of transceiver assemblies. The RF receivers 108(9) may be configured to acquire RF signals 508 associated with Wi-Fi, Bluetooth, ZigBee, 5G, 4G, 3G, LTE, or other wireless data transmission technologies. The RF receivers 108(9) may provide information associated with data transmitted via radio frequencies, signal strength of RF signals 508, and so forth. For example, information from the RF receivers 108(9) may be used by the inventory management system 110 to determine a location of an RF source, such as a communication interface onboard the tote 414.

The sensors 108 may include one or more accelerometers 108(10), which may be worn or carried by the user 412, mounted to the tote 414, and so forth. The accelerometers 108(10) may provide information such as the direction and magnitude of an imposed acceleration. Data such as rate of acceleration, determination of changes in direction, speed, and so forth, may be determined using the accelerometers 108(10).

A gyroscope 108(11) may provide information indicative of rotation of an object affixed thereto. For example, the tote 414 or other objects may be equipped with a gyroscope 108(11) to provide data indicative of a change in orientation of the object.

A magnetometer 108(12) may be used to determine an orientation by measuring ambient magnetic fields, such as the terrestrial magnetic field. The magnetometer 108(12) may be worn or carried by the user 412, mounted to the tote 414, and so forth. For example, the magnetometer 108(12) mounted to the tote 414 may act as a compass and provide information indicative of which direction the tote 414 is oriented.

An optical sensor array 108(13) may comprise one or optical sensors 108(7). The optical sensors 108(7) may be arranged in a regular, repeating, or periodic two-dimensional arrangement such as a grid. The optical sensor array 108(13) may generate image data. For example, the optical sensor array 108(13) may be arranged within or below a fixture 102 and obtain information about shadows of items 106, hand of the user 412, and so forth.

The sensors 108 may include proximity sensors 108(14) used to determine presence of an object, such as the user 412, the tote 414, and so forth. The proximity sensors 108(14) may use optical, electrical, ultrasonic, electromagnetic, or other techniques to determine a presence of an object. In some implementations, the proximity sensors 108(14) may use an optical emitter and an optical detector to determine proximity. For example, an optical emitter may emit light, a portion of which may then be reflected by the object back to the optical detector to provide an indication that the object is proximate to the proximity sensor 108(14). In other implementations, the proximity sensors 108(14) may comprise a capacitive proximity sensor 108(14) configured to provide an electrical field and determine a change in electrical capacitance due to presence or absence of an object within the electrical field.

The proximity sensors 108(14) may be configured to provide sensor data indicative of one or more of a presence or absence of an object, a distance to the object, or characteristics of the object. An optical proximity sensor 108(14) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 108 such as a camera 108(1). Based on an apparent distance between the features of the structured light pattern, the distance to the object may be calculated. Other techniques may also be used to determine distance to the object. In another example, the color of the reflected light may be used to characterize the object, such as skin, clothing, tote 414, and so forth.

The sensors 108 may include other sensors 108(5) as well. For example, the other sensors 108(S) may include light curtains, ultrasonic rangefinders, thermometers, barometric sensors, hygrometers, and so forth. For example, the inventory management system 110 may use information acquired from thermometers and hygrometers in the facility 402 to direct the user 412 to check on delicate items 106 stored in a particular fixture 102, which is overheating, too dry, too damp, and so forth.

In one implementation, a light curtain may utilize a linear array of light emitters and a corresponding linear array of light detectors. For example, the light emitters may comprise a line of infrared light emitting diodes (LEDs) or vertical cavity surface emitting lasers (VCSELs) that are arranged above a top shelf 104 in front of the fixture 102, while the light detectors comprise a line of photodiodes sensitive to infrared light arranged below the light emitters. The light emitters produce a "lightplane" or sheet of infrared light that is then detected by the light detectors. An object passing through the lightplane may decrease the amount of light falling upon the light detectors. For example, the user's 412 hand would prevent at least some of the light from light emitters from reaching a corresponding light detector. As a result, a position along the linear array of the object may be determined that is indicative of a touchpoint. This position may be expressed as touchpoint data, with the touchpoint being indicative of the intersection between the hand of the user 412 and the sheet of infrared light. In some implementations, a pair of light curtains may be arranged at right angles relative to one another to provide two-dimensional touchpoint data indicative of a position of touch in a plane. Input from the light curtain, such as indicating occlusion from a hand of a user 412 may be used to trigger acquisition or selection of image data 112 for processing by the inventory management system 110.

The sensors 108(S) may also include an instrumented auto-facing unit (AFU). The instrumented AFU may comprise a position sensor configured to provide data indicative of displacement of a pusher. As an item 106 is removed from the AFU, the pusher moves, such as under the influence of a spring, and pushes the remaining items 106 in the AFU to the front of the fixture 102. By using data from the position sensor, and given item data 118 such as a depth of an individual item 106, a count may be determined, based on a change in position data. For example, if each item 106 is 1 inch deep, and the position data indicates a change of 5 inches, the quantity held by the instrumented AFU may have changed by 5 items 106. This count information may be used to confirm or provide a cross check for the output data 144.

In some implementations, the camera 108(1) or other sensors 108 may include hardware processors, memory, and other elements configured to perform various functions. For example, the cameras 108(1) may be configured to generate image data 112, send the image data 112 to another device such as the server 504, and so forth.

The facility 402 may include one or more access points 510 configured to establish one or more wireless networks. The access points 510 may use Wi-Fi, NFC, Bluetooth, or other technologies to establish wireless communications between a device and the network 502. The wireless networks allow the devices to communicate with one or more of the sensors 108, the inventory management system 110, the optical sensor arrays 108(13), the tag 506, a communication device of the tote 414, or other devices.

Output devices 512 may also be provided in the facility 402. The output devices 512 are configured to generate signals, which may be perceived by the user 412 or detected by the sensors 108. In some implementations, the output devices 512 may be used to provide illumination of the optical sensor array 108(13).

Haptic output devices 512(1) are configured to provide a signal that results in a tactile sensation to the user 412. The haptic output devices 512(1) may use one or more mechanisms such as electrical stimulation or mechanical displacement to provide the signal. For example, the haptic output devices 512(1) may be configured to generate a modulated electrical signal, which produces an apparent tactile sensation in one or more fingers of the user 412. In another example, the haptic output devices 512(1) may comprise piezoelectric or rotary motor devices configured to provide a vibration, which may be felt by the user 412.

One or more audio output devices 512(2) may be configured to provide acoustic output. The acoustic output includes one or more of infrasonic sound, audible sound, or ultrasonic sound. The audio output devices 512(2) may use one or more mechanisms to generate the acoustic output. These mechanisms may include, but are not limited to, the following: voice coils, piezoelectric elements, magnetorestrictive elements, electrostatic elements, and so forth. For example, a piezoelectric buzzer or a speaker may be used to provide acoustic output.

The display devices 512(3) may be configured to provide output, which may be seen by the user 412 or detected by a light-sensitive sensor such as a camera 108(1) or an optical sensor 108(7). In some implementations, the display devices 512(3) may be configured to produce output in one or more of infrared, visible, or ultraviolet light. The output may be monochrome or in color. The display devices 512(3) may be one or more of emissive, reflective, microelectromechanical, and so forth. An emissive display device 512(3), such as using LEDs, is configured to emit light during operation. In comparison, a reflective display device 512(3), such as using an electrophoretic element, relies on ambient light to present an image. Backlights or front lights may be used to illuminate non-emissive display devices 512(3) to provide visibility of the output in conditions where the ambient light levels are low.

The display devices 512(3) may be located at various points within the facility 402. For example, the addressable displays may be located on fixtures 102, totes 414, on the floor of the facility 402, and so forth.

Other output devices 512(P) may also be present. For example, the other output devices 512(P) may include scent/odor dispensers, document printers, 3D printers or fabrication equipment, and so forth.

Figure 6:
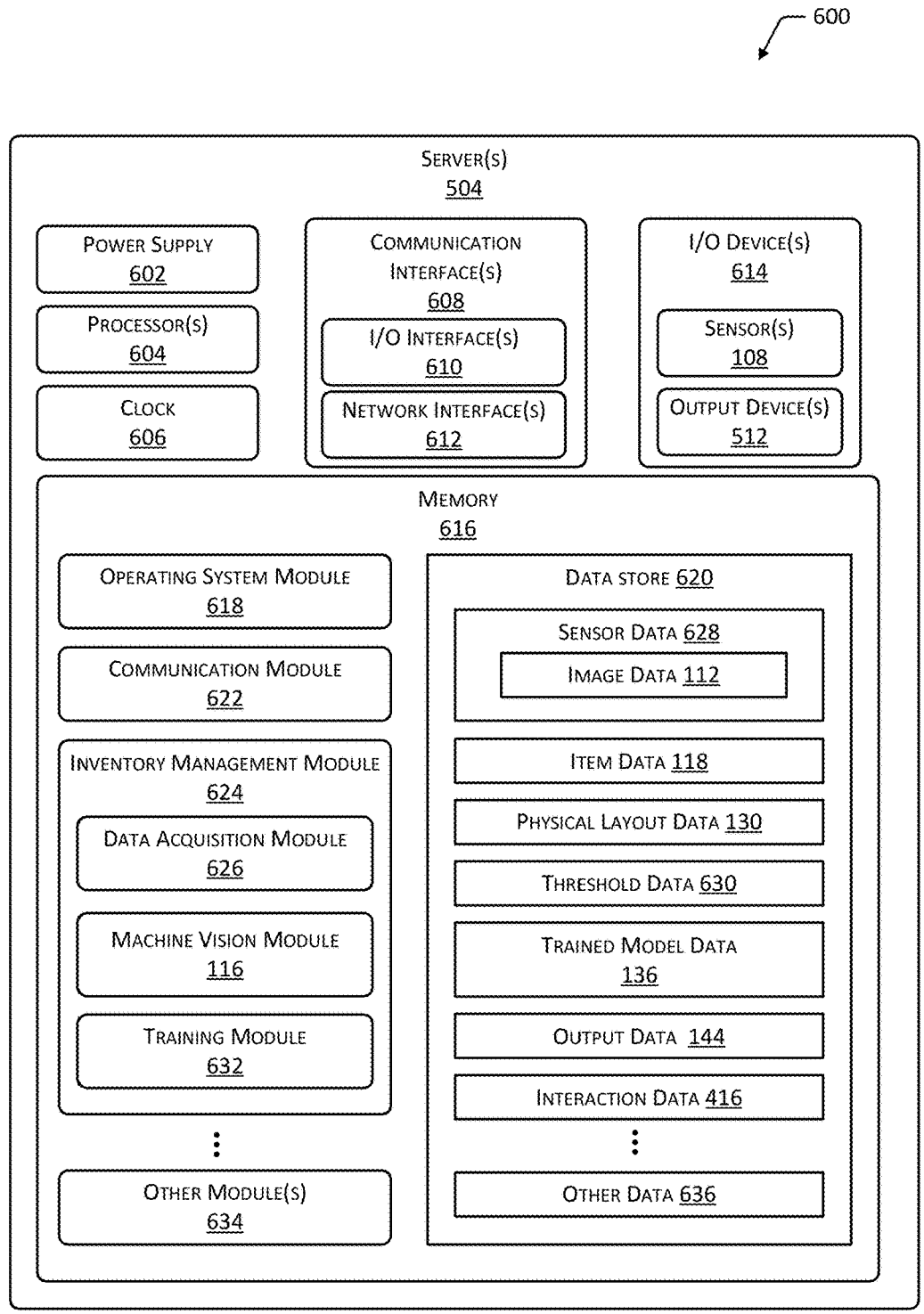
FIG. 6 is a block diagram of a server to support operation of the facility, including the image processing system, according to some implementations.

FIG. 6 illustrates a block diagram 600 of a server 504 configured to support operation of the facility 402, according to some implementations. The server 504 may be physically present at the facility 402, may be accessible by the network 502, or a combination of both. The server 504 does not require end-user knowledge of the physical location and configuration of the system that delivers the services. Common expressions associated with the server 504 may include "on-demand computing", "software as a service (SaaS)", "platform computing", "network-accessible platform", "cloud services", "data centers", and so forth. Services provided by the server 504 may be distributed across one or more physical or virtual devices.

One or more power supplies 602 may be configured to provide electrical power suitable for operating the components in the server 504. The one or more power supplies 602 may comprise batteries, capacitors, fuel cells, photovoltaic cells, wireless power receivers, conductive couplings suitable for attachment to an external power source such as provided by an electric utility, and so forth. The server 504 may include one or more hardware processors 604 (processors) configured to execute one or more stored instructions. The processors 604 may comprise one or more cores. One or more clocks 606 may provide information indicative of date, time, ticks, and so forth. For example, the processor 604 may use data from the clock 606 to associate a particular interaction with a particular point in time.

The server 504 may include one or more communication interfaces 608 such as input/output (I/O) interfaces 610, network interfaces 612, and so forth. The communication interfaces 608 enable the server 504, or components thereof, to communicate with other devices or components. The communication interfaces 608 may include one or more I/O interfaces 610. The I/O interfaces 610 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 610 may couple to one or more I/O devices 614. The I/O devices 614 may include input devices such as one or more of a sensor 108, keyboard, mouse, scanner, and so forth. The I/O devices 614 may also include output devices 512 such as one or more of a display device 512(3), printer, audio speakers, and so forth. In some embodiments, the I/O devices 614 may be physically incorporated with the server 504 or may be externally placed.

The network interfaces 612 may be configured to provide communications between the server 504 and other devices, such as the totes 414, routers, access points 510, and so forth. The network interfaces 612 may include devices configured to couple to personal area networks (PANs), local area networks (LANs), wireless local area networks (WLANS), wide area networks (WANs), and so forth. For example, the network interfaces 612 may include devices compatible with Ethernet, Wi-Fi, Bluetooth, ZigBee, and so forth.

The server 504 may also include one or more busses or other internal communications hardware or software that allow for the transfer of data between the various modules and components of the server 504.

As shown in FIG. 6, the server 504 includes one or more memories 616. The memory 616 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 616 provides storage of computer-readable instructions, data structures, program modules, and other data for the operation of the server 504. A few example functional modules are shown stored in the memory 616, although the same functionality may alternatively be implemented in hardware, firmware, or as a system on a chip (SoC).

The memory 616 may include at least one operating system (OS) module 618. The OS module 618 is configured to manage hardware resource devices such as the I/O interfaces 610, the I/O devices 614, the communication interfaces 608, and provide various services to applications or modules executing on the processors 604. The OS module 618 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 616 may be a data store 620 and one or more of the following modules. These modules may be executed as foreground applications, background tasks, daemons, and so forth. The data store 620 may use a flat file, database, linked list, tree, executable code, script, or other data structure to store information. In some implementations, the data store 620 or a portion of the data store 620 may be distributed across one or more other devices including the servers 504, network attached storage devices, and so forth.

A communication module 622 may be configured to establish communications with one or more of the totes 414, sensors 108, display devices 512(3), other servers 504, or other devices. The communications may be authenticated, encrypted, and so forth.

The memory 616 may store an inventory management module 624. The inventory management module 624 is configured to provide the inventory functions as described herein with regard to the inventory management system 110. For example, the inventory management module 624 may track items 106 between different fixtures 102, to and from the totes 414, and so forth.

The inventory management module 624 may include one or more of a data acquisition module 626, machine vision module 116, and training module 632, so forth. The data acquisition module 626 may be configured to acquire and access information associated with operation of the facility 402. For example, the data acquisition module 626 may be configured to acquire sensor data 628 from one or more of the sensors 108.

The sensor data 628 may also be stored in the data store 620. The sensor data 628 may include a sensor identifier that comprises data indicative of a particular sensor 108, such as a certain camera 108(1), weight sensor 108(6), and so forth. The sensor identifier may be unique in the context of a particular fixture 102, aisle 410, facility 402, or globally across multiple facilities 402. The sensor data 628 may be generated or acquired by one or more of the sensors 108. The sensor data 628 may include one or more of the sensor identifiers, a timestamp, image data 112, non-image sensor data, or other data. The timestamp may comprise information indicative of a time when the sensor data 628 was acquired. For example, the timestamp may be based at least in part on time data obtained from a clock onboard the sensor 108, by the clock 406 on the server 504, and so forth. The inventory management module 624 may use the timestamp to determine the interaction data 416. For example, the timestamp may be used to determine a sequence of the image data 112, such as to determine the image data 112 occurring before and after an interaction at the fixture 102.

The sensor data 628 may be broadly categorized as comprising image-based sensor data and non-image based sensor data. For example, the image data 112 obtained from a camera 108(1) may be considered image-based sensor data, while weight data acquired from the weight sensor 108(6) may comprise non-image based sensor data.

The sensor data 628 may include other data. For example, other data may comprise information indicative of operational status of the sensor 108, error messages associated with the sensor 108, and so forth.

The memory 616 may include the machine vision module 116, as described above. The machine vision module 116 may access one or more of the item data 118, the physical layout data 130, the trained model data 136, threshold data 630, and so forth, during operation. The threshold data 630 may comprise one or more thresholds associated with operation of the inventory management module 624. For example, the threshold data 630 may indicate a tolerance or acceptable amount of intersection between two estimated item locations 140, the working volume 302, and so forth. For example, an intersection of the estimated item location 140 and the boundaries of the working volume 302 may be disregarded if the intersection is less than 5 millimeters.

The machine vision module 116, as also described above, may be configured to generate output data 144. For example, the image data 112 of a shelf 104 may be processed by the machine vision module 116 to determine item count data 146 indicative of a number of a type of item 106 on the shelf 104. In some implementations, the machine vision module 116 may also determine the item identification data 148, indicative of which items 106 are depicted in the image data 112.

The machine vision module 116 may determine a change in the count of items 106 at the fixture 102 by processing image data 112 at different times and calculating a difference in the item count data 146. In one implementation, the machine vision module 116 may compare the position of one or more of the estimated top location 138 or the estimated item location 140 between a first image data 112(1) acquired at a first time and second image data 112(2) acquired at a second time. If the estimated locations in the first image and the second image exhibit a match that exceeds a threshold value, no change may be deemed to have taken place. For example, if the same item 106 is present in the same location in two subsequent images, no change is deemed to take place. However, if the two estimated locations do not match within the threshold value, something may have changed at the fixture 102. Based on the change in the item count data 146, a pick or place may be determined. In some implementations, the extent of the match as described above may be used to determine a score. The score may be used to assess the predicted change in item count. Predicted changes in item count that have a low score may be discarded or ignored, while high scoring predicted changes in item count may be provided as output data 144.

The machine vision module 116 may determine points ($P2_{top}$) that are associated with the 2D data 120 in the estimated top location 138. The corresponding 3D volume points ($P3_{top}$) that are obtained from the 3D data 122 are used to solve for $R_{top}$ and $T_{top}$ using Perspective-n-Point (PnP) algorithm with K representing the camera matrix. Then the estimated item location 140 or points of the estimated top location 138 may be transformed using equations 1 and 2 below into the shelf coordinate space ($P3_{shelf}$) using camera calibration ($E_C$) data. These equations use the Perspective-n-Point (PnP) algorithm. In one implementation utilizing OpenCV, the SolvePnP( ) function may be used to implement this algorithm as described in equation 1.

$$[R_{top}T_{top}]=\text{solvePnP}(P2_{top},P3_{top},K) \quad \text{Equation 1}$$

$$P3_c=E_c*[R_{top}T_{top};0\ 0\ 0\ 1]*P3_{top} \quad \text{Equation 2}$$

In these equations, subscript "c" indicates camera 108(1), subscript "top" indicates the estimated top location 138.

In one implementation, the machine vision module 116 may determine four or more points that correspond to a particular portion of the type of item. For example, these points may correspond to an item top 114. In some implementations the four or more points may correspond to other points, such as a top and a side, a side, and so forth, of the item. Using the PnP algorithm and intrinsic parameters of a camera 108(1) that acquired the image data 112, 3D rotation of the top relative to the camera 108(1) may be determined. The PnP algorithm may also be used to determine a 3D translation of the item top relative to the camera 108(1). The estimated item location 140 may then be fixed in space. Four or more points of the estimated item location 140 in 3D space may be determined using the 3D rotation, the 3D translation, and extrinsic camera parameters of the camera 108(1). As a result, the estimate item location 140 is determined in space, constrained by the four or more points.

During operation, the machine vision module 116 may utilize the trained model data 136. For example, the trained model data 136, as described above, may comprise a previously trained neural network or settings indicative thereof. In other implementations, the trained model data 136 may comprise previously configured algorithms that have been trained to recognize a particular item 106 or portion thereof.

The machine vision module 116 may generate the output data 144. For example, the output data 144 may comprise the item count data 146, the item identification data 148, or other information. In some implementations, the inventory management module 624 may utilize the output data 144, or output from other modules, to generate the interaction data 416. The interaction data 416 may then be used to facilitate operation of the facility 402, such as by changing the quantity on hand maintained in the item data 118, issuing an alert for restocking at a particular fixture 102, and so forth.

Processing of one or more of the image data 112 may be performed by the machine vision module 116 implementing, at least in part, one or more of the following tools or techniques. In one implementation, processing of the image data 112 may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 628. In still another implementation, functions such as those in the Machine Vision Toolbox for Matlab (MVTB) available using MATLAB as developed by Math Works, Inc. of Natick, Mass., USA, may be utilized.

Techniques such as artificial neural networks (ANNs), active appearance models (AAMs), active shape models (ASMs), principal component analysis (PCA), cascade classifiers, and so forth, may also be used to process the sensor data 628 or other data. For example, the ANN may be trained using a supervised learning algorithm such that object identifiers are associated with images of particular objects within training images provided to the ANN. Once trained, the ANN may be provided with the sensor data 628 such as the image data 112.

The machine vision module 116 may process image data 112 to determine the item tops 114. For example, the machine vision module 116 may be configured to recognize item tops 114 of the items 106 in the image data 112. This determination may be based on item data 118, such as previously acquired images of a sampled item 106, or the trained model data 136. Each of the item tops 114 of the type of item 106 appearing in the image data 112 may be identified and an associated estimated item location 140 may be determined. As described above, a candidate volume 142 may be determined and the item count data 146 may be determined from the candidate volume 142.

Changes in item count over time may also be determined. For example, a change in the item count data 146 may be determined based on first image data 112(1) and second image data 112(2) obtained at a first time and a second time, respectively.

In one implementation, the machine vision module 116 uses one or more algorithms to determine the item tops 114 of items 106 in the FOV 202. For example, a HOG algorithm may be used to extract the features of the items 106 that appear in the image data 112. A SVM may then be used to classify the extracted features and determine which of the extracted features correspond to items 106.

A training module 632 may also be stored in the memory 616. The training module 632 may be used to generate item data 118, trained model data 136, and so forth. For example, the training module 632 may be used during receiving or intake of items 106 for the facility 402. For example, the training module 632 may use image data 112 acquired from a plurality of difference poses, such as rotation, translation, and so forth, between the item 106 and the camera 108(1) to train a machine vision algorithm and produce trained model data 136. Continuing the example, the item 106 may be placed on a turntable and images acquired at different angles. Cameras 108(1) at different distances from the item 106 may acquire image data 112 at different distances. The training module 632 may use a variety of different sensors 108. For example, cameras 108(1), depth sensors 108(2), and so forth, may be used to gather sensor data 628 which may then be used to generate the trained model data 136. The cameras 108(1) used may be calibrated, such that extrinsic camera parameters and intrinsic camera parameters are known.

The training module 632 may be used to train the machine vision module 116 to detect the item top 114 and thus characterize the estimated top location 138 and the estimated item location 140. During training, a single item 106 may be used, and given this known quantity, the trained model data 136 may be generated that associates the item top 114 with the estimated top location 138 and the estimated item location 140 of the known item 106.

Other modules 634 may also be present in the memory 616 as well as other data 636 in the data store 620. For example, the other modules 634 may include an accounting module while the other data 636 may include billing data. The accounting module may be configured to assess charges to accounts associated with particular users 412 or other entities, while the billing data may include information such as payment account numbers.

Illustrative Processes

Figure 7:
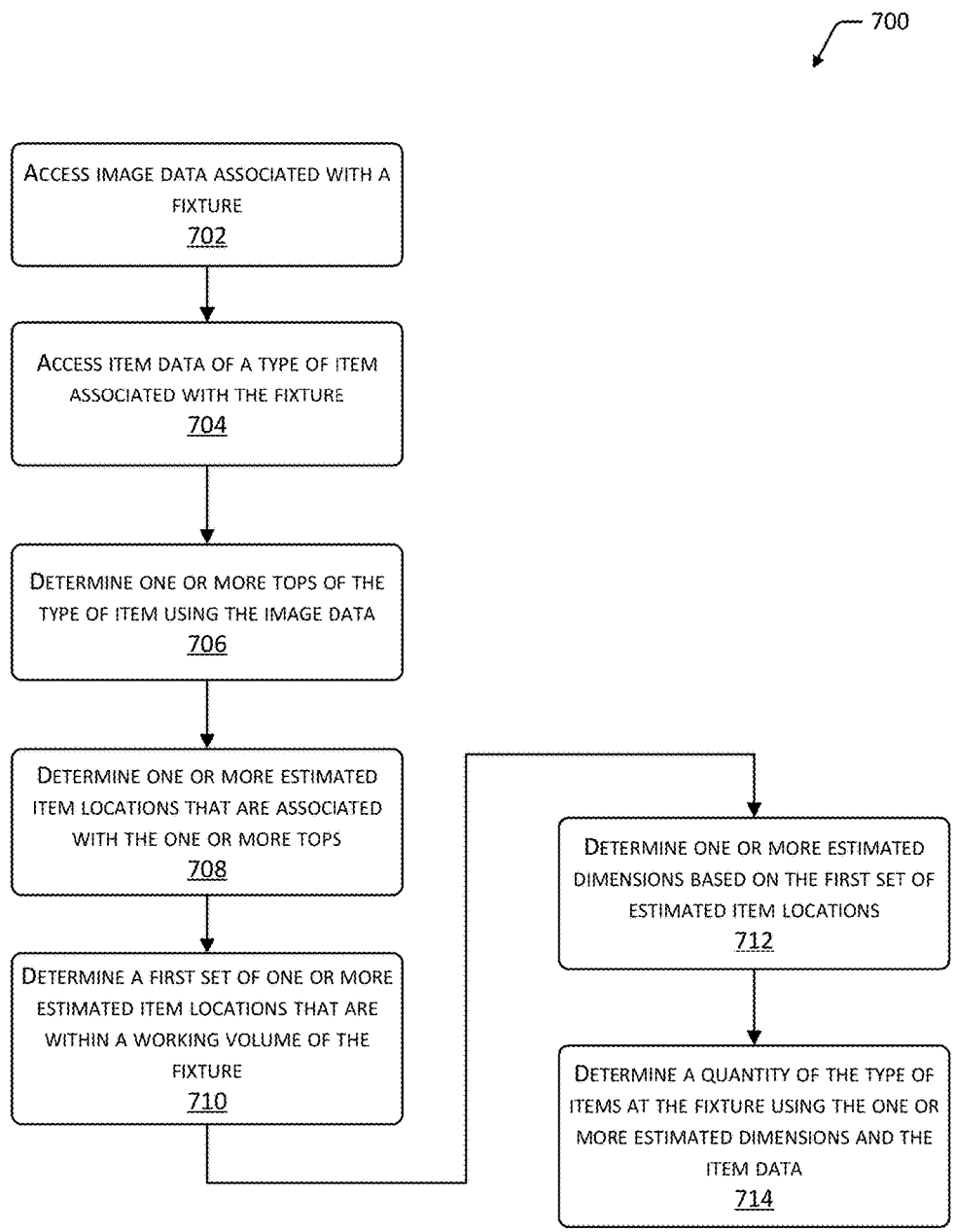
FIG. 7 depicts a flow diagram of a process for determining the item count data using the image data, according to some implementations.

FIG. 7 depicts a flow diagram 700 of a process for determining the item count data 146 using the image data 112, according to some implementations. The process may be implemented at least in part by the inventory management module 624. In different implementations, one or more of the blocks described below may be omitted, the sequence of the process using these blocks may vary from that depicted, and so forth.

At 702, image data 112 associated with a fixture 102 is accessed. For example, the image data 112 may be acquired using a camera 108(1) positioned above the shelf 104 and having a FOV 202 that includes at least a portion of the shelf 104 at an oblique angle with respect to a plane of the shelf 104.

At 704, item data 118 is accessed for a type of item 106 associated with the fixture 102. For example, item data 118 may be retrieved that is associated with a particular fixture ID.

At 706, one or more item tops 114 of the type of item 106 are determined using the image data 112. For example, the machine vision module 116 may generate the estimated top location 138.

At 708, one or more estimated item locations 140 are determined. For example, the machine vision module 116 may generate the estimated item locations 140 for each of the item tops 114 that have been determined.

At 710, a first set of one or more estimated item locations 140 that are within a working volume 302 of the fixture 102 are determined. For example, those estimated item locations 140 that are invalid as being at least partially outside of the working volume 302 may be omitted from the first set. The first set may thus comprise those estimated item locations 140 that have been deemed valid. For example, they may be estimated item locations 140 that are within the working volume 302, do not intersect another estimated item location 140, and so forth.

At 712, one or more estimated dimensions are determined based on the first set of estimated item locations 140 is determined. For example, the estimated dimensions may include one or more of estimated height, width, or depth of a candidate volume 142, or portions thereof. For example, the candidate volume 142 may comprise a volume that is a union or merger of the valid estimated item locations 140, and may also include valid estimated item locations 140 that have been expanded as described above.

At 714, a quantity of the type of items 106 at the fixture 102 are determined using the one or more estimated dimensions and the 3D data 122. For example, the candidate volume 142 may be assessed using the reference volume data 124 for a single item 106 to determine the item count data 146 indicative of quantity of that type of item 106 at the fixture 102. In some implementations, instead of volume, the estimated dimensions may include an estimated height Z1 of each stack as expressed by an estimated item location 140 may be used to determine the item count data 146. For example, the height Z1 of an estimated item location 140 that is valid may be 150 centimeters. The item data 118 may indicate that each individual item 106 is 50 cm. By dividing the height Z1 by the height of an individual item 106, it may be determined that the stack includes a quantity of 3 items 106. By summing the quantities in the stacks present within the working volume 302 as represented by the valid estimated item locations 140, the item count data 146 may be determined.

In one implementation, each estimated top location 138 may be associated with a particular estimated item location 140.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a memory, storing computer-executable instructions; and
a hardware processor to execute the computer-executable instructions to:
  access image data representative of a fixture;
  access data indicative of a type of item associated with the fixture;
  access two-dimensional (2D) data indicative of at least a portion of a top of the type of item;
  access three-dimensional (3D) data associated with the type of item;
  determine, using the image data, one or more estimated tops of the type of item at the fixture;
  determine one or more estimated item locations associated with the one or more estimated tops of the type of item at the fixture, wherein the one or more estimated item locations are indicative of points in 3D space;
  determine a first set of the one or more estimated item locations that comprises those estimated item locations that are within a working volume of the fixture, the working volume comprising a volume where the type of item could be physically present;
  determine one or more estimated dimensions based at least in part on the first set of one or more the estimated item locations; and
  determine a quantity of the type of item at the fixture using the one or more estimated dimensions and the 3D data associated with the type of item.

2. The system of claim 1, wherein the one or more estimated dimensions include height, width, and depth that describe a candidate volume.

3. The system of claim 1, wherein the working volume comprises a volume bounded at least in part by a portion of the fixture that is designated to store items.

4. The system of claim 1, wherein the image data is obtained by a camera having a centerline of a field-of-view that is at an oblique angle relative to a plane of the fixture.

5. The system of claim 4, the computer-executable instructions to determine the one or more estimated item locations associated with the one or more estimated tops of the type of item at the fixture further comprising computer-executable instructions to:
  determine four or more points of a top of the one or more estimated tops of the type of item at the fixture;
  determine a 3D rotation of the top of the one or more estimated tops of the type of item at the fixture relative to the camera;
  determine a 3D translation of the top of the one or more estimated tops of the type of item at the fixture relative to the camera; and
  determine four or more points of an estimated item location in 3D space using the 3D rotation and the 3D translation and extrinsic camera parameters of the camera.

6. The system of claim 1, further comprising computer-executable instructions to:
  determine a first estimated item location is above and intersects at least in part a second estimated item location;
  remove the second estimated item location from the first set of the one or more estimated item locations; and
  extend the first estimated item location down to a surface of the fixture.

7. The system of claim 1, the computer-executable instructions to determine, using the image data, the one or more estimated tops of the type of item at the fixture further comprising computer-executable instructions to:
  access trained model data associated with identification of a corresponding top of a corresponding item; and
  process the image data with a classifier using the trained model data to recognize at least one particular top of one particular item using the trained model data.

8. The system of claim 1, wherein the type of item comprises a rigid container, and the computer-executable instructions to determine the one or more estimated tops of the type of item at the fixture further comprising computer-executable instructions to:
  process the image data using a histogram of oriented gradients algorithm to determine one or more occurrences of the type of item in the image data.

9. A system comprising:
a shelf to hold one or more of a type of item;
a camera positioned above the shelf and having a field-of-view that includes at least a portion of the shelf; and
a computing device comprising:
  a memory, storing computer-executable instructions; and
  a hardware processor to execute the computer-executable instructions to:
    acquire image data obtained by the camera;
    identify the type of item associated with the shelf;
    access item data of the type of item, wherein the item data comprises:
      two-dimensional (2D) data indicative of at least a portion of a top of the type of item, and
      three-dimensional (3D) data indicative of an overall shape and size of the type of item;

determine one or more tops of the type of item at the shelf using the image data;

determine one or more estimated item locations associated with the one or more tops of the type of item at the shelf;

determine at least one of the one or more estimated item locations within a working volume of the shelf, the working volume comprising a volume bounded by one or more portions of the shelf; and determine a quantity of the type of item at the shelf using the at least one of the one or more estimated item locations and the 3D data.

10. The system of claim 9, wherein:

the volume bounded by the one or more portions of the shelf comprises a volume associated with a lane of the shelf within which the type of item may be stowed and not intrude on components of the shelf and adjacent lanes.

11. The system of claim 9, further comprising computer-executable instructions to:

process the image data with a classifier to recognize the one or more tops of the type of item at the shelf.

12. A method comprising:

accessing image data acquired by a camera of a fixture;

identifying a type of item associated with the fixture;

accessing item data of the type of item, wherein the item data comprises:

two-dimensional (2D) data indicative of at least a portion of a top of the type of item, and three-dimensional (3D) data associated with the type of item;

determining four or more points in 3D space associated with one or more tops of the type of item;

determining one or more estimated item locations of the one or more tops of the type of item that are within a working volume of the fixture, the working volume comprising a volume within which the type of item may be stowed on a lane of a shelf; and determining a quantity of the type of item at the fixture based on the one or more estimated item locations.

13. The method of claim 12, the determining the quantity of the type of item at the fixture further comprising determining an integer number of times that a volume of an individual item as indicated by the 3D data will fit within the one or more estimated item locations.

14. The method of claim 12, further comprising:

determining a first quantity of the type of item at the fixture using first image data acquired at a first time;

determining a second quantity of the type of item at the fixture using second image data acquired at a second time; and determining a change in quantity using the first quantity and the second quantity.

15. The method of claim 12, the determining the four or more points in 3D space associated with the one or more tops of the type of item further comprising:

accessing trained model data associated with identification of the type of item in the image data; and processing the image data with a machine vision module trained using the trained model data to recognize the one or more tops of the type of item.

16. The method of claim 12, further comprising:

acquiring, using a second camera, a plurality of images of an item of the type of item, wherein the plurality of images are acquired at a plurality of different poses relative to the second camera; and generating trained model data using the plurality of images.

17. The method of claim 12, wherein the image data is representative of a foreshortened image of the fixture.

18. The method of claim 12, further comprising:

accessing physical layout data indicative of a rotation of the camera with respect to the fixture and a translation of the camera with respect to the fixture; and wherein the determining the one or more estimated item locations uses the physical layout data.

19. The method of claim 12, wherein:

the working volume is bounded at least in part by a portion of the fixture that is designated to store items.

20. The method of claim 12, further comprising:

determining a first estimated item location of the one or more estimated item locations intersects at least a portion of a second estimated item location;

disregarding the second estimated item location; and extending the first estimated item location to a surface of the fixture.

* * * * *